(12) United States Patent
Takasaka et al.

(10) Patent No.: US 8,948,542 B2
(45) Date of Patent: Feb. 3, 2015

(54) IMAGE PROCESSING APPARATUS

(75) Inventors: Michiaki Takasaka, Kawasaki (JP); Hisashi Ishikawa, Urayasu (JP)

(73) Assignee: Canon Kabushiki Kaisha, Tokyo (JP)

(*) Notice: Subject to any disclaimer, the term of this patent is extended or adjusted under 35 U.S.C. 154(b) by 860 days.

(21) Appl. No.: 13/153,061

(22) Filed: Jun. 3, 2011

(65) Prior Publication Data

US 2011/0317938 A1    Dec. 29, 2011

(30) Foreign Application Priority Data

Jun. 25, 2010  (JP) ................................. 2010-145528
May 19, 2011  (JP) ................................. 2011-112897

(51) Int. Cl.
*G06K 9/60* (2006.01)
*G06T 3/40* (2006.01)

(52) U.S. Cl.
CPC ........................................ *G06T 3/40* (2013.01)
USPC ........... 382/303; 382/298; 382/300; 382/195; 382/254; 382/284; 382/272

(58) Field of Classification Search
USPC .......... 382/300, 195, 254, 272, 284, 298, 303
See application file for complete search history.

(56) References Cited

U.S. PATENT DOCUMENTS

| | | | | |
|---|---|---|---|---|
| 4,665,556 A * | 5/1987 | Fukushima et al. | ........... | 382/304 |
| 5,047,854 A | 9/1991 | Iwabuchi et al. | | |
| 5,068,905 A * | 11/1991 | Hackett et al. | ................ | 382/299 |
| 5,517,666 A * | 5/1996 | Ohtani et al. | ..................... | 712/3 |
| 5,542,109 A * | 7/1996 | Blomgren et al. | ............ | 712/234 |
| 5,666,484 A | 9/1997 | Orimo et al. | | |
| 5,706,490 A * | 1/1998 | Beard et al. | .................... | 712/234 |
| 7,027,665 B1 * | 4/2006 | Kagle et al. | .................... | 382/284 |
| 7,142,214 B2 * | 11/2006 | Hutchins et al. | .............. | 345/503 |
| 7,254,280 B2 * | 8/2007 | Kagle et al. | .................... | 382/284 |
| 7,525,548 B2 * | 4/2009 | Azar et al. | ..................... | 345/504 |
| 7,580,151 B2 * | 8/2009 | Kurose et al. | .................. | 358/1.9 |
| 7,696,994 B2 * | 4/2010 | Illmann | ......................... | 345/423 |
| 7,834,873 B2 * | 11/2010 | Kurupati | ........................ | 345/423 |
| 7,944,450 B2 * | 5/2011 | Bakalash et al. | .............. | 345/505 |
| 7,969,444 B1 * | 6/2011 | Biermann et al. | ............. | 345/502 |
| 2003/0128216 A1 * | 7/2003 | Walls et al. | ..................... | 345/506 |
| 2005/0122347 A1 * | 6/2005 | Buerkle et al. | ................. | 345/660 |

(Continued)

FOREIGN PATENT DOCUMENTS

JP   63-247858 A   10/1988
JP   01-023340 A   1/1989

(Continued)

*Primary Examiner* — Jayesh A Patel

(74) *Attorney, Agent, or Firm* — Fitzpatrick, Cella, Harper & Scinto

(57) ABSTRACT

An image processing apparatus for processing image data by a plurality of pipeline-connected processing modules is provided. The apparatus includes a first pipeline processing unit configured to include a plurality of processing modules including a processing module which processes image data for every first size; and a second pipeline processing unit configured to be branched from the first pipeline processing unit and include a plurality of processing modules including a processing module which processes image data for every second size different from the first size. The second pipeline processing unit includes, at a start, a change unit configured to acquire partial image data of the first size from the first pipeline processing unit and change the partial image data of the first size into partial image data of the second size.

16 Claims, 22 Drawing Sheets

(56) References Cited

U.S. PATENT DOCUMENTS

| | | | |
|---|---|---|---|
| 2005/0168770 A1* | 8/2005 | Kurose et al. | 358/1.15 |
| 2006/0066731 A1* | 3/2006 | Zhou | 348/222.1 |
| 2007/0013702 A1* | 1/2007 | Hiroi et al. | 345/502 |
| 2007/0230817 A1* | 10/2007 | Kokojima | 382/268 |
| 2007/0291040 A1* | 12/2007 | Bakalash et al. | 345/505 |
| 2008/0068389 A1* | 3/2008 | Bakalash et al. | 345/505 |
| 2008/0165198 A1* | 7/2008 | Bakalash et al. | 345/505 |
| 2009/0079747 A1* | 3/2009 | Johnson et al. | 345/506 |
| 2009/0135190 A1* | 5/2009 | Bakalash et al. | 345/506 |
| 2009/0161954 A1 | 6/2009 | Inoue et al. | |
| 2009/0179894 A1* | 7/2009 | Bakalash et al. | 345/422 |
| 2010/0253849 A1* | 10/2010 | Kegasawa | 348/584 |

FOREIGN PATENT DOCUMENTS

| | | |
|---|---|---|
| JP | 2518293 B | 7/1996 |
| JP | 2734246 B | 3/1998 |
| JP | 2834210 B | 12/1998 |
| JP | 2009-151571 A | 7/2009 |

* cited by examiner

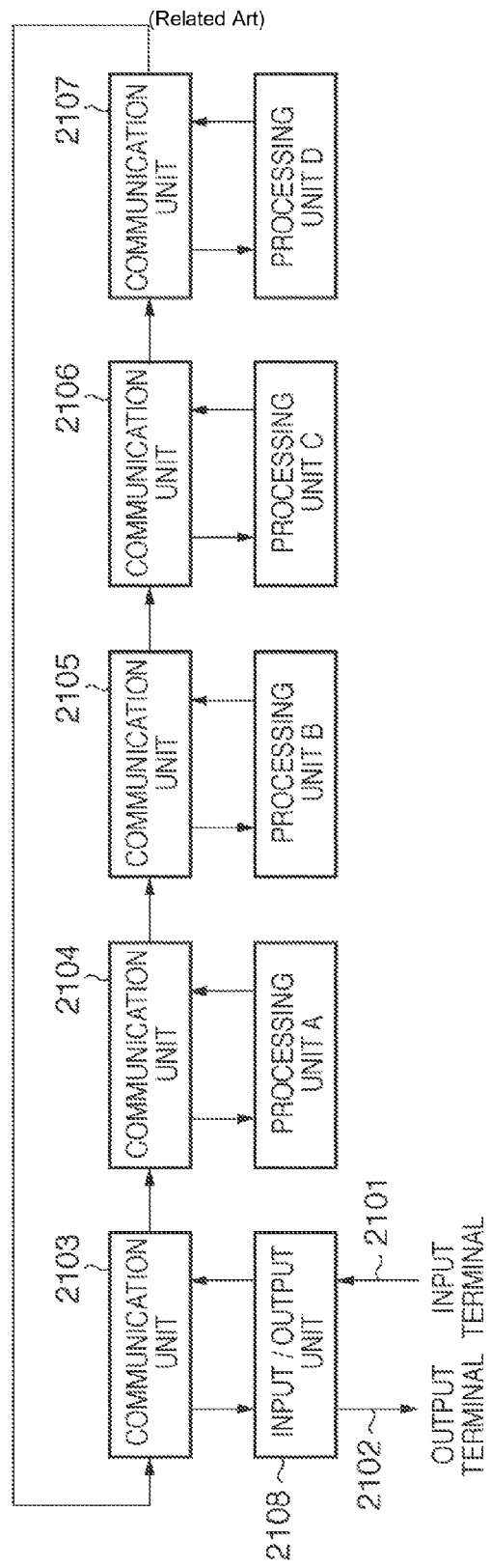

F I G. 20A
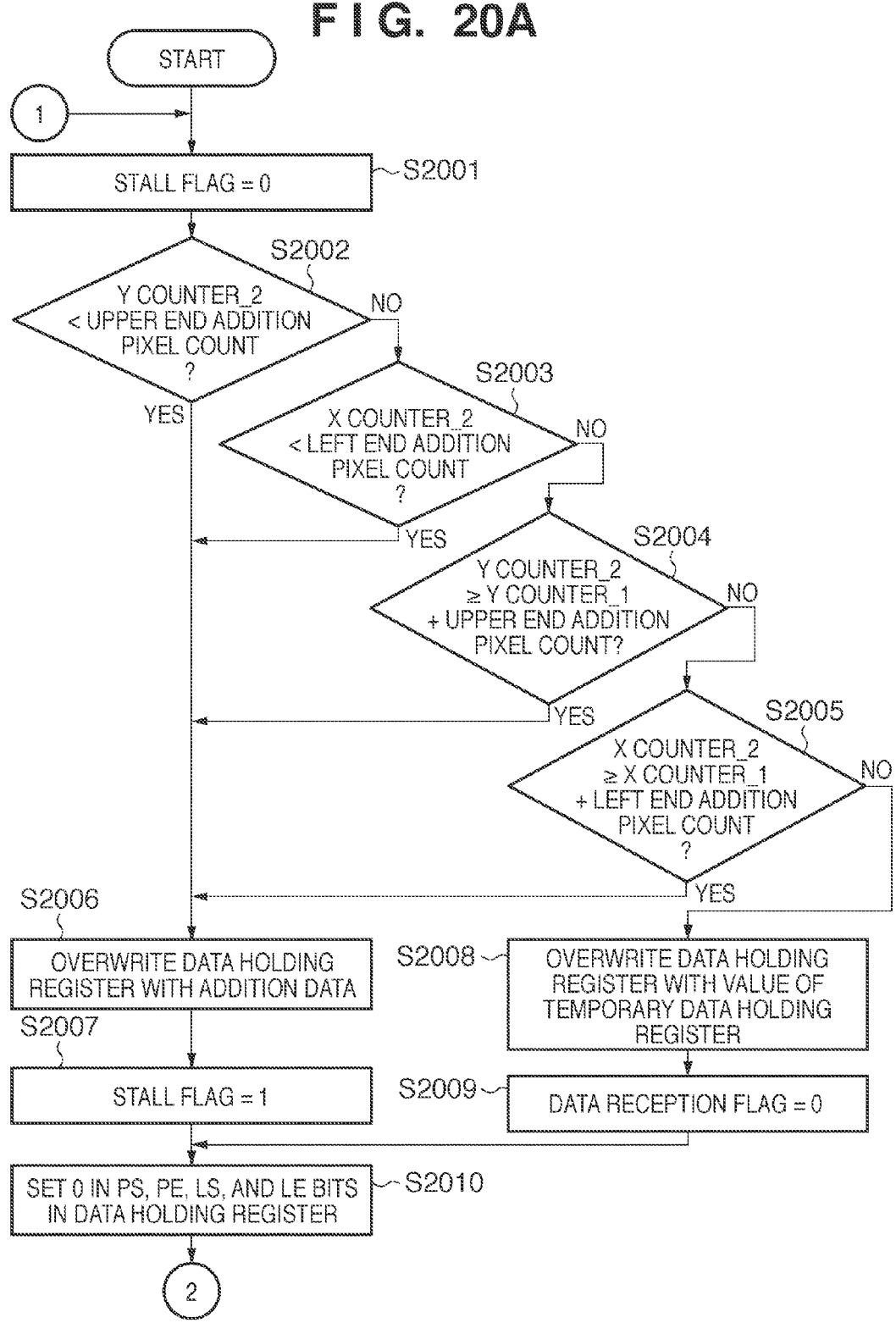

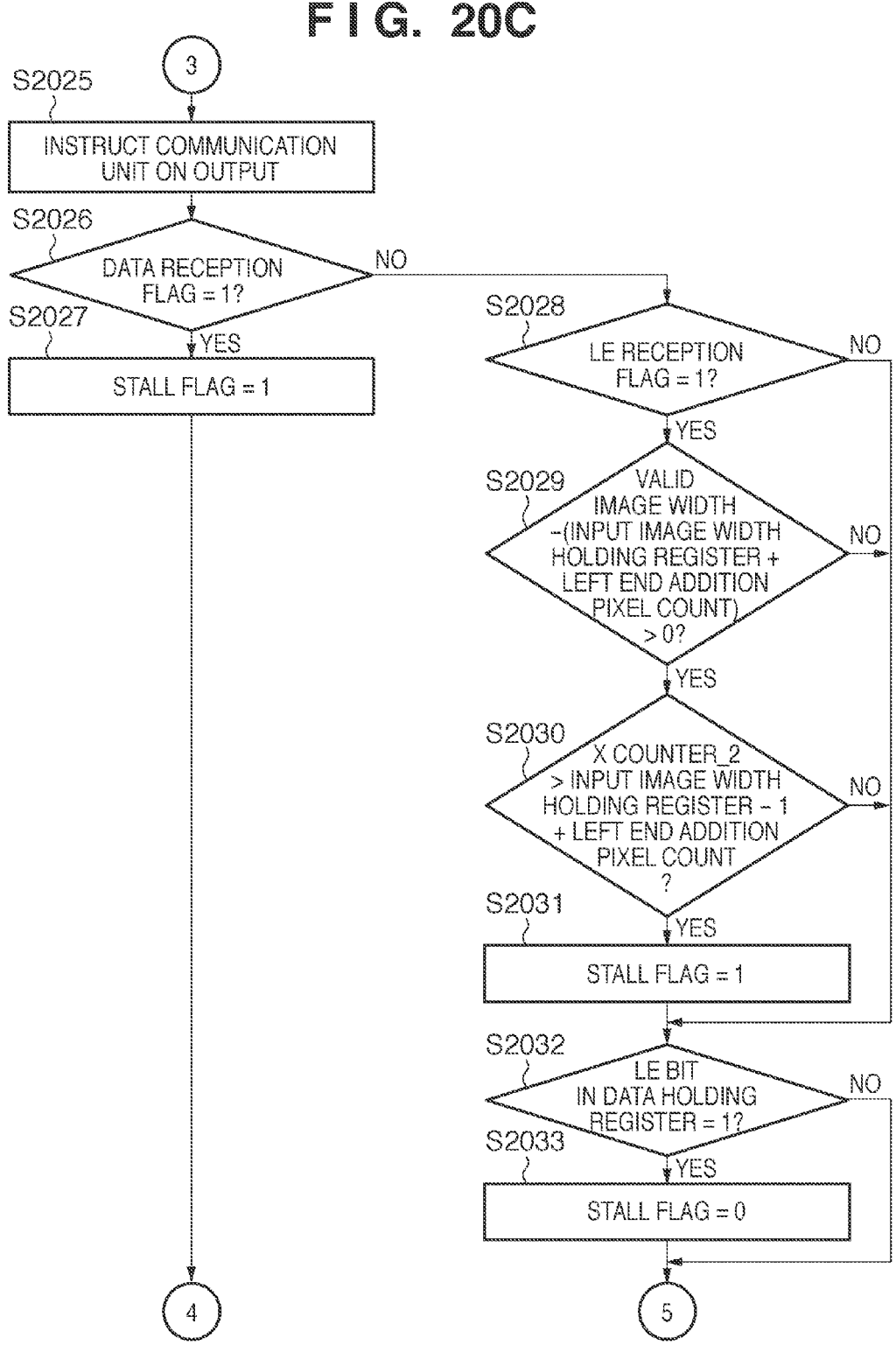
F I G. 20C

F I G. 20D
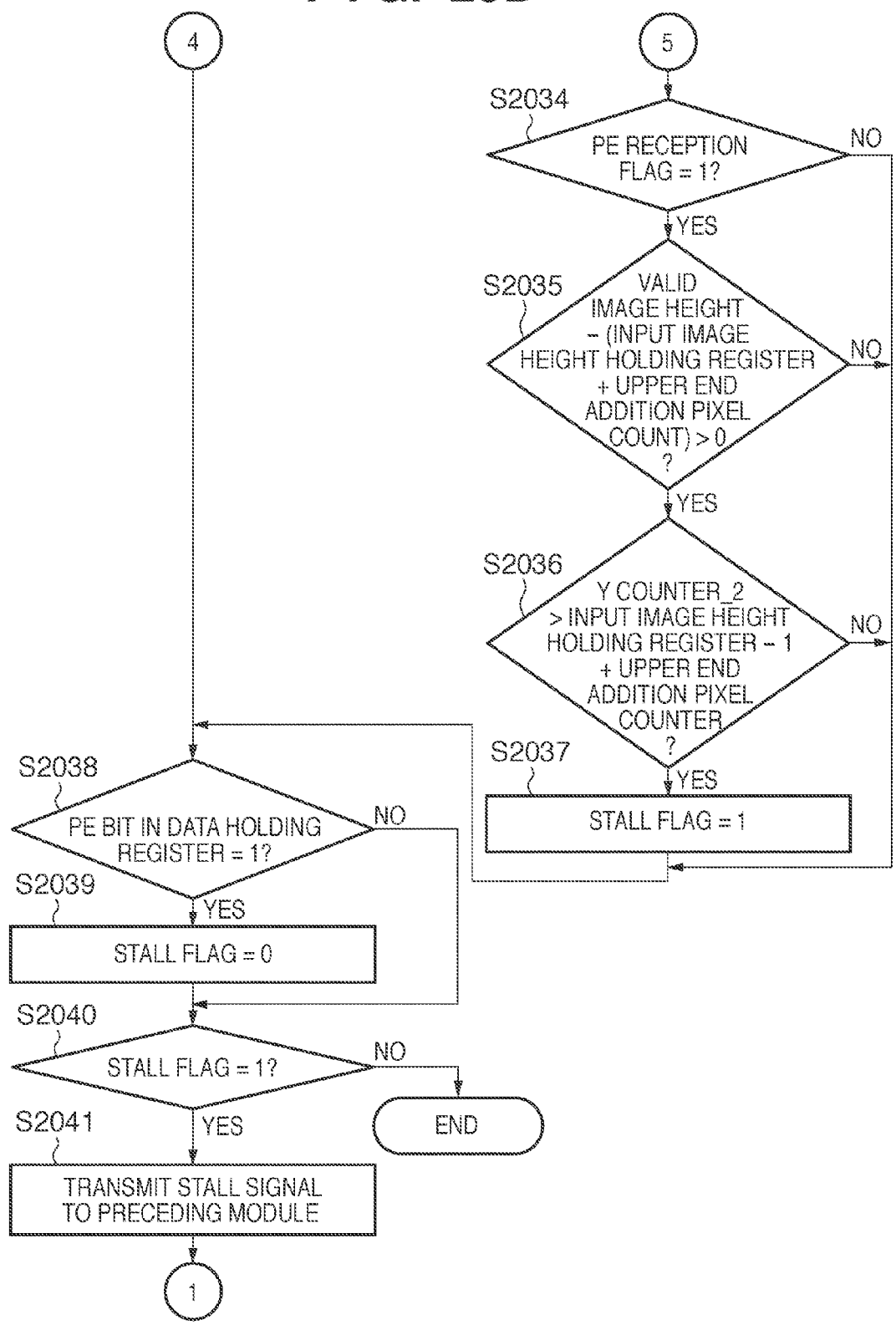

IMAGE PROCESSING APPARATUS

BACKGROUND OF THE INVENTION

1. Field of the Invention

The present invention relates to an image processing apparatus.

2. Description of the Related Art

An example of conventional methods of parallelly executing processes by a plurality of hardware units is a bus pipeline connection method as disclosed in Japanese Patent No. 2734246. According to this connection method, input data is processed in an order in which a plurality of processors are physically connected, and then is output to an external memory or the like from an output terminal. A plurality of processors cannot process data in an arbitrary processing order. To solve this problem, a method of connecting processors by a ring bus is proposed in, for example, Japanese Patent Laid-Open No. 01-023340 and Japanese Patent Nos. 2834210 and 2518293.

There is also proposed a method which employs the concept of a signal flow graph. In this method, a transmission source ID (identifier) is added to data to be sent onto a ring bus so that a processor which has processed the data last can be specified. A subsequent processor waits for the sent data in which the transmission source ID is set, thereby branching the processing flow. The branch of the processing flow will be explained in short.

FIG. 17 is a block diagram for explaining a ring bus processing block including four processing units A to D which process data, and one input/output unit 2108 which inputs/outputs data. In this processing block, a plurality of communication units 2103 to 2107 are connected in a ring shape. Each of the communication units 2103 to 2107 is connected to one of the processing units A to D or the input/output unit 2108. FIGS. 18A and 18B exemplify a signal flow graph indicating the logical connection relation between data processes performed using the processing block of FIG. 17. In the signal flow graph, arrowed lines represent processes which correspond to those in the processing units A to D. Circled nodes represent the logical connection relation between the processes. Each node has an ID. Each of the communication units 2103 to 2107 has a transmission source ID register and waiting ID register. The transmission source ID register stores the ID of a node at the end point of an arrowed line indicating a processing unit connected to the communication unit. An ID stored in the transmission source ID register will be called a transmission source ID. When a connected processing unit performs processing, the communication unit adds its transmission source ID to data and transfers the data to a subsequent communication unit. The subsequent communication unit can specify the processing unit which has processed the transferred data last. The waiting ID register stores the ID of a node at the start point of an arrowed line indicating a processing unit connected to the communication unit. An ID stored in the waiting ID register will be called a waiting ID. When the waiting ID of the communication unit matches a transmission source ID added to received data, the communication unit transfers the data to the processing unit to process it. In this way, the communication unit has the transmission source ID register and waiting ID register. This makes it possible to logically branch the processing flow in the processing block having communication units connected physically in a ring shape. A concrete example when the processing flow does not have a branch and a concrete example when it has a branch will be explained with reference to FIGS. 18A and 18B.

FIG. 18A shows a signal flow graph when the input/output unit 2108 inputs data to the ring bus, and the processing units A, B, C, and D process data sequentially, and the input/output unit 2108 sends the processed data to an external memory or the like. According to this graph, an arrowed line corresponding to the processing unit A is connected from node "1" to node "2". The communication unit 2104 connected to the processing unit A transfers data received from node "1" to the processing unit A to process it, and transmits the processed data to node "2". The communication unit 2104 stores "2" in the transmission source ID register and "1" in the waiting ID register.

Similarly, the communication unit 2105 connected to the processing unit B stores "3" in the transmission source ID register and "2" in the waiting ID register. The communication unit 2106 connected to the processing unit C stores "4" in the transmission source ID register and "3" in the waiting ID register. The communication unit 2107 connected to the processing unit D stores "5" in the transmission source ID register and "4" in the waiting ID register.

The communication unit 2103 connected to the input/output unit 2108 stores "1" in the transmission source ID register and "5" in the waiting ID register. After the registers in the communication units 2103 to 2107 are set in a desired processing order, as described above, data processing starts. Then, the following data transfer is done.

The input/output unit 2108 transfers data input from an input terminal 2101 to the communication unit 2103. The communication unit 2103 generates a packet having the received data and the transmission source ID "1" of the communication unit 2103, and transfers the packet to the subsequent communication unit 2104. The communication unit 2104 compares the transmission source ID in the transferred packet with the waiting ID of the communication unit 2104. In this example, these IDs match each other, so the communication unit 2104 inputs the data in the packet to the processing unit A. The communication unit 2104 then generates a packet having the data processed by the processing unit A and the transmission source ID "2" of the communication unit 2104, and transfers the packet to the subsequent communication unit 2105. The processing proceeds in the same way, and the communication unit 2107 transfers, to the communication unit 2103, a packet having the data processed in order by the processing units A to D and the transmission source ID "5". The communication unit 2103 extracts the data from the packet, and transfers it to the input/output unit 2108. The input/output unit 2108 outputs the data from an output terminal 2102.

FIG. 18B shows a signal flow graph when the processing flow has a branch. In this processing flow, the input/output unit 2108 inputs data to the ring bus. The processing unit A processes the data, the processing units B and C further process the data, and the input/output unit 2108 sends, to the external memory or the like, data obtained by processing the resultant data by the processing unit D. When the processing flow has a branch, as shown in FIG. 18B, the transmission source ID registers and waiting ID registers of the communication units 2103 to 2107 are also set to satisfy a connection relation represented by the graph. More specifically, the communication unit 2103 stores "1" in the transmission source ID register and "4" in the waiting ID register. The communication unit 2104 stores "2" in the transmission source ID register and "1" in the waiting ID register. Each of the communication units 2105 and 2106 stores "3" in the transmission source ID register and "2" in the waiting ID register. The communication unit 2107 stores "4" in the transmission source ID register and "3" in the waiting ID register. By setting the registers in this manner, the processing flow can be branched.

As described above, the processing flow can be branched in the method of connecting processors by a ring bus. In actual image processing such as filter processing, pixels around a pixel of interest are sometimes referred to process the pixel of interest. In this processing, to process pixels positioned near four sides of an input image, pixels outside the input image sometimes need to be referred. If processing is done without referring to neighboring pixels, pixels are deleted from the input image by the width of neighboring pixels referred in filter processing or the like. As a result, the number of pixels of the input image and that of pixels of the output image differ from each other. In this case, a problem readily occurs in image processing because the image needs to successively pass through a plurality of filters having different filter coefficients. This is because, as the filtering count increases, the number of pixels of an image decreases, making it difficult to ensure a valid image range in a final output image. When an input image 2402 undergoes filter processing, a region 2401 (hatched portion) is created outside the input image 2402 based on pixels positioned at the edges of the input image 2402, as shown in FIG. 19. Filter processing is done for an image 2403 obtained by adding the region 2401 to the input image 2402. The region 2401 outside the input image 2402 will be called an auxiliary region. By adding the auxiliary region, even if filter processing consumes the auxiliary region, an output image equal in the number of pixels to the input image 2402 can be obtained.

Japanese Patent Laid-Open No. 63-247858 proposes a method of adding a control code to data, sending the data to a ring bus, and receiving the data in accordance with the control code. With this control code, a plurality of processors can receive data of an overlapping portion, and the receiving processors redundantly send the data of the overlapping portion to the ring bus. The respective processors set the data of the overlapping portion, and separately perform data processes. Japanese Patent Laid-Open No. 2009-151571 proposes a technique of efficiently using a small-capacity internal memory and generating neighboring pixels using input data.

SUMMARY OF THE INVENTION

When sequentially processing image data, a processing flow having a branch as shown in FIG. 18B sometimes cannot be executed properly. As an example, a case in which the processing unit B refers to a region of five pixels on each of the upper, lower, right, and left sides of a pixel of interest, and the processing unit C refers to a region of three pixels on each of the upper, lower, right, and left sides of the pixel of interest will be examined. At this time, in the processing flow shown in FIG. 18B, the processing unit A supplies the same image data to the processing units B and C. Assuming that the number of pixels of the image data is 100×100, the processing unit B consumes five pixels from each of the top, bottom, right, and left of the image, outputting image data of 90×90 pixels. To the contrary, the processing unit C consumes three pixels from each of the top, bottom, right, and left of the image, outputting image data of 94×94 pixels. The processing unit D has to perform complicated processing such as alignment of two different images.

The present invention has been made to overcome the conventional drawbacks, and has as one aspect to provide a technique for efficiently executing a processing flow having a branch in an image processing apparatus which sequentially processes image data.

A first aspect of the present invention provides an image processing apparatus for processing image data by a plurality of pipeline-connected processing modules, comprising: a first pipeline processing unit configured to include a plurality of processing modules including a processing module which processes image data for every first size; and a second pipeline processing unit configured to be branched from the first pipeline processing unit and include a plurality of processing modules including a processing module which processes image data for every second size different from the first size, wherein the second pipeline processing unit includes, at a start, a change unit configured to acquire partial image data of the first size from the first pipeline processing unit and change the partial image data of the first size into partial image data of the second size. A second aspect of the present invention provides a n image processing apparatus for processing image data by a plurality of pipeline-connected processing modules, comprising: a first pipeline processing unit configured to include a plurality of processing modules including a processing module which processes image data for every first size; a second pipeline processing unit configured to be merged with the first pipeline processing unit and include a plurality of processing modules including a processing module which processes image data for every second size different from the first size; and a change unit configured to be arranged at an end of the second pipeline processing unit and change partial image data of the second size into partial image data of the first size.

Further features of the present invention will become apparent from the following description of exemplary embodiments (with reference to the attached drawings).

BRIEF DESCRIPTION OF THE DRAWINGS

The accompanying drawings, which are incorporated in and constitute a part of the specification, illustrate embodiments of the invention, and together with the description, serve to explain the principles of the invention.

FIG. 17 is a block diagram showing a reference example of three data processing units and one data input/output unit;

FIGS. 20A to 20D are a flowchart of an output unit in processing of the addition unit in still another embodiment.

DESCRIPTION OF THE EMBODIMENTS

As a comparative example for embodiments of the present invention, an example in which, when a branch flow is generated, the use efficiency of a packet moving through a pipeline drops in an image processing apparatus that sequentially processes image data will be explained.

Figure 15:
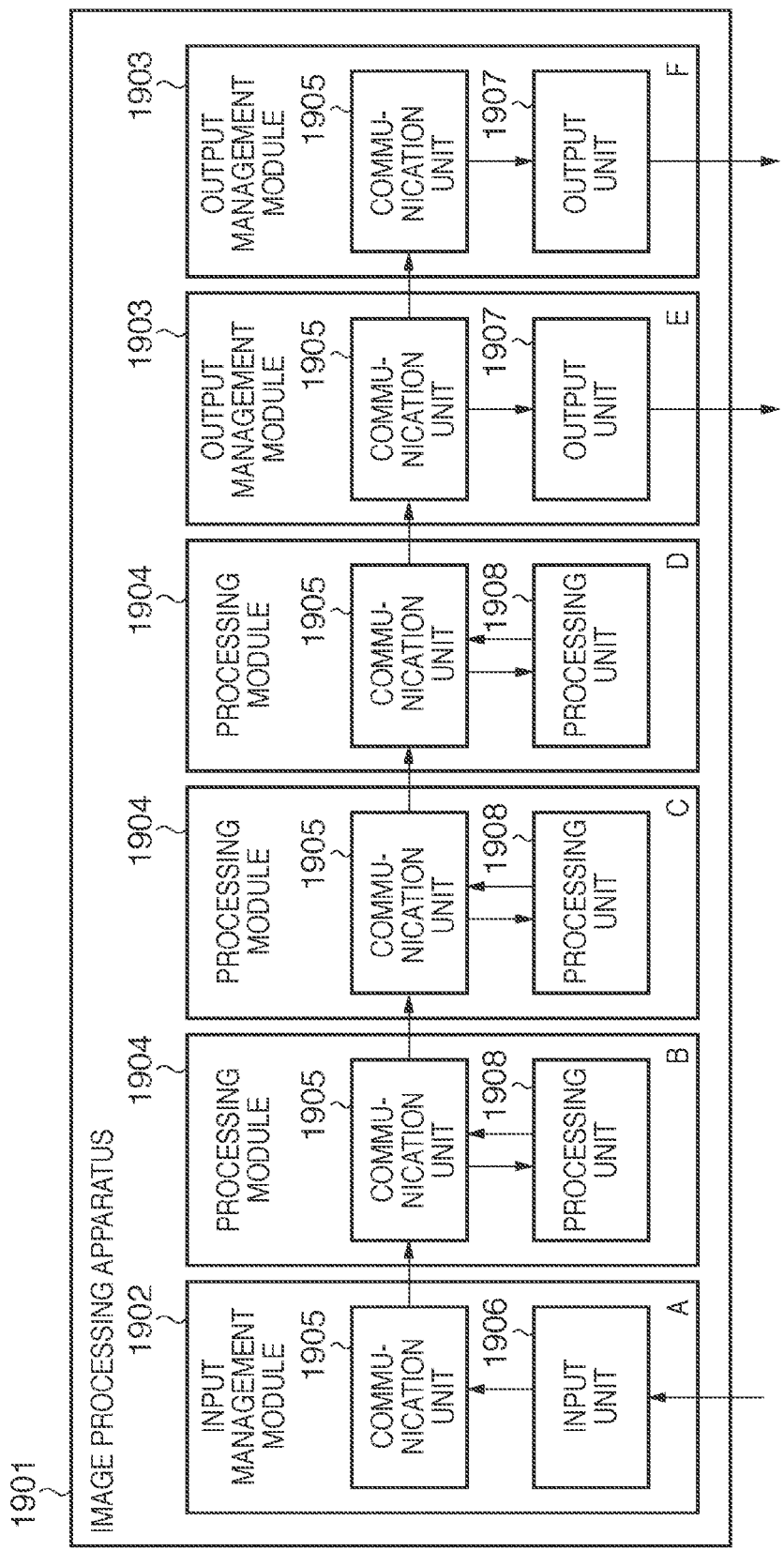
FIG. 15 is a block diagram showing the arrangement of a reference example of an image processing apparatus.

FIG. 15 exemplifies the arrangement of an image processing apparatus 1901 having a communication path and a plurality of modules. In this example, a plurality of modules are physically connected in series by the communication path. A plurality of modules connected physically directly will be called a pipeline. The respective modules arranged in line transfer image data transferred from a preceding module (module on the left side in FIG. 15) to a subsequent module (module on the right side in FIG. 15), as indicated by arrows in FIG. 15. As a plurality of modules, the image processing apparatus 1901 includes an input management module 1902, output management modules 1903, and processing modules 1904. The input management module 1902 acquires image data to be processed from an external memory or the like, and transfers it to a subsequent module. The output management module 1903 outputs, to the external memory or the like, processed image data transferred from a preceding module. The processing module 1904 processes image data transferred from a preceding module, as needed. In the example shown in FIG. 15, the image processing apparatus 1901 includes one input management module 1902, two output management modules 1903, and three processing modules 1904, but the number of modules of each type is not limited to this. For example, the image processing apparatus 1901 may include a plurality of input management modules 1902. In this case, the respective input management modules 1902 acquire image data to be processed.

Each module includes a communication unit 1905. The communication unit 1905 stores image data in a packet, and performs communication between modules. The packet structure will be described later. The input management module 1902 further includes an input unit 1906. The input unit 1906 acquires image data from the external memory or the like, adds, to the periphery, an auxiliary region of a predetermined size to be consumed in subsequent processing, and transfers the resultant image data to the communication unit 1905. The output management module 1903 further includes an output unit 1907. The output unit 1907 combines data from the communication unit 1905 into image data, and outputs the image data to the external memory or the like. The processing module 1904 further includes a processing unit 1908. The processing unit 1908 performs predetermined processing for image data received from the communication unit 1905, and returns the processed image data to the communication unit 1905.

Figure 16:
FIG. 16 is a view showing a reference example of a packet structure.

FIG. 16 shows the structure of the packet used in communication between modules in the image processing apparatus 1901 of FIG. 15. A field 2001 stores a flag indicating whether to process image data held in the packet. That is, this flag has the same meaning as that of a validation flag indicating whether the packet is in use. The flag in the field 2001 will be called a VALID bit. For example, a VALID bit "1" indicates that image data is "valid", and a VALID bit "0" indicates that image data is "invalid".

A field 2002 stores the transmission source ID of a module which has processed data in the packet last. A plurality of modules in the image processing apparatus 1901 have unique IDs for identifying the respective modules. For example, as shown in FIG. 15, the respective modules have IDs "A" to "F" in order from the upstream to downstream of the pipeline. Each communication unit 1905 has a transmission source ID register and waiting ID register, and a transmission source ID and waiting ID are set prior to pipeline processing. A field 2003 stores data. The data may be a pixel value or command.

Figure 11A:
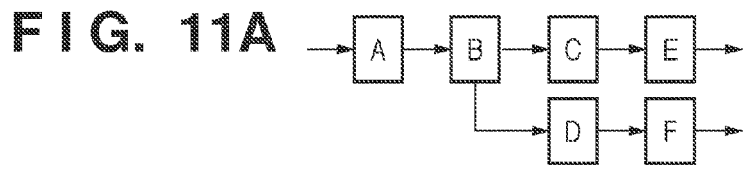
FIGS. 11A to 11F are views exemplifying various structures of processing flows having branches.

The branch of the pipeline will be explained with reference to FIGS. 11A to 11F. In the graphs of FIGS. 11A to 11F, squared nodes represent processes by modules, and arrows indicate the processing order and connection relation. Only the example of FIG. 11A will be explained, and the remaining examples will be described later. A processing flow shown in FIG. 11A is formed from processes performed by six modules A to F. Respective nodes in the graph correspond to processes in the modules A to F. The module A is the input management module 1902, the modules B, C, and D are the processing modules 1904, and the modules E and F are the output management modules 1903. In this processing flow, the module A executes processing first. Since the module A is the input management module 1902, processing in the module A is data acquisition. Then, the module B processes the data processed, that is, acquired by the module A. Since the module B is the processing module, processing in the module B is processing by the processing unit 1908. The data processed by the module B is transferred to both the modules C and D, and processed. Finally, the modules E and F serving as the output management modules 1903 output the data. To implement the processing flow shown in FIG. 11A, a transmission source ID and waiting ID are set in each communication unit prior to processing.

In the processing flow shown in FIG. 11A, when the processing units of the modules C and D require auxiliary regions of different sizes, addition of an auxiliary region adapted to only either processing unit may disable processing by the other processing unit.

To avoid this, a conceivable method activates the image processing apparatus 1901 twice to parallelly perform pipeline processing in order of A, B, C, and E and that in order of A, B, D, and F. For example, one more input management module A' is added, and a processing flow by the modules A, B, C, and E and that by the modules A', B, D, and F coexist in the image processing apparatus 1901.

However, the method of activating the image processing apparatus 1901 twice requires an overhead for activation processing, setting processing, and the like in the image processing apparatus 1901, increasing the amount of time necessary for the whole image processing. Also, the number of packets between the modules A and B is doubled, decreasing the processing speed.

Of processing flows having a branch, one of a series of parts logically connected in series will be called the first processing flow, and parts branched from the first processing flow will be called the second processing flow. In the example of FIG. 11A, the modules A, B, C, and E (first module group)

execute the first processing flow in the processing flow formed from processes by the modules A to F, and the modules D and F (second module group) execute the second processing flow. The second processing flow may be merged with the first processing flow. A processing flow further diverted from the second processing flow will be called the third processing flow. In the example of FIG. 11A, it may be expressed that the modules A, B, D, and F execute the first processing flow, and the modules C and E execute the second processing flow. In these processing flows, parts of parallel processes will be called branch flows. In the example of FIG. 11A, processes by the modules D and F form the first branch flow, and those by the modules C and E form the second branch flow.

Figure 1:
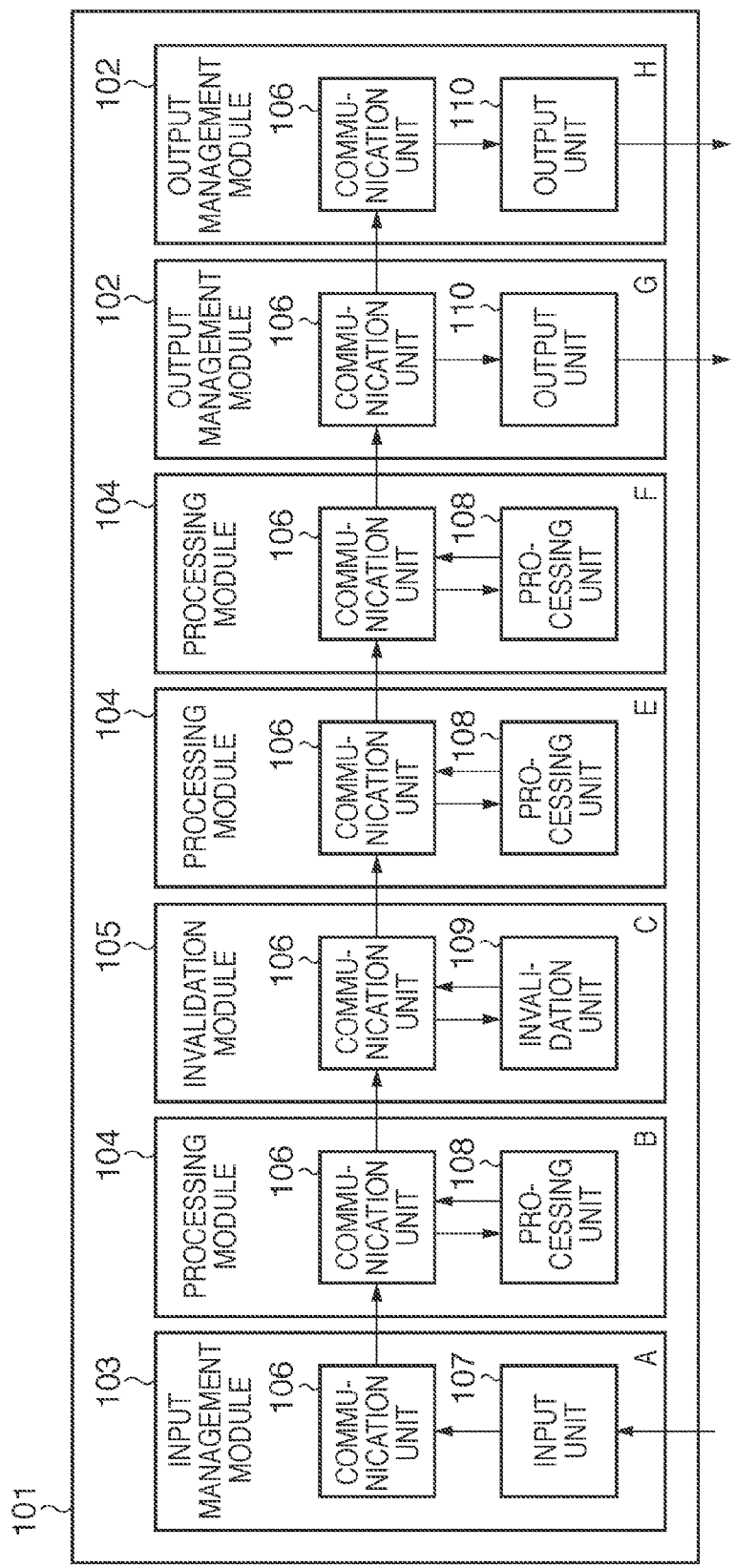
FIG. 1 is a block diagram showing the arrangement of an image processing apparatus in an embodiment.

FIG. 1 is a block diagram showing the overall arrangement of an image processing apparatus 101 according to an embodiment. The image processing apparatus 101 includes a plurality of modules which process image data for respective partial image data (blocks, several pixels, or pixel). As these modules, the image processing apparatus 101 includes output management modules 102, an input management module 103, a plurality of processing modules 104, and an invalidation module 105. Communication units 106 of these modules are connected in series. The respective modules arranged in line transfer data transferred from a preceding module (module on the left side in FIG. 1) to a subsequent module (module on the right side in FIG. 1), as indicated by arrows in FIG. 1. The input management module 103 further includes an input unit 107. The output management module 102 further includes an output unit 110. The processing module 104 further includes a processing unit 108. The invalidation module 105 further includes an invalidation unit 109. The input unit 107, output unit 110, and processing unit 108 are identical to the input unit 1906, output unit 1907, and processing unit 1908 in FIG. 15, respectively, so a repetitive description thereof will be omitted. To change the number of pixels of image data, the invalidation unit 109 invalidates image data contained in a packet in accordance with the set value. By invalidating the image data, a portion having corresponding pixels in the auxiliary region is deleted. The invalidation unit 109 does not change image data contained in a valid region corresponding to image data input to the image processing apparatus 101 out of image data input from a preceding module. The invalidation unit 109 outputs image data from which part of the auxiliary region positioned around the valid region has been deleted.

Figure 2:
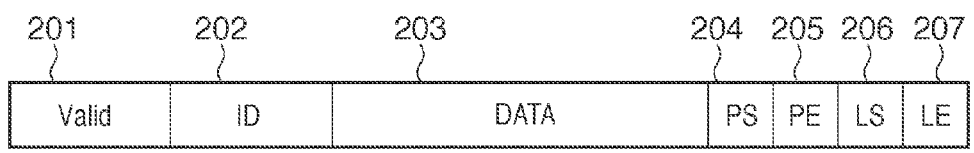
FIG. 2 is a view exemplifying a packet structure.

FIG. 2 exemplifies the structure of a packet used in communication between modules in the image processing apparatus 101 of FIG. 1. Fields 201 to 203 are identical to the fields 2001 to 2003 in FIG. 16, and a repetitive description thereof will be omitted. A field 204 stores a page start bit (to be referred to as a PS bit) indicating whether a pixel contained in image data in the field 203 belongs to a page start position, that is, whether a pixel contained in the packet is contained in the start row of a page. The PS bit becomes "1" when a pixel contained in the packet belongs to the page start position, and "0" when it does not belong. A field 205 stores a page end bit (to be referred to as a PE bit) indicating whether a pixel contained in the packet belongs to a page end position, that is, whether a pixel contained in the packet is contained in the final row of a page. The PE bit becomes "1" when a pixel contained in the packet belongs to the page end position, and "0" when it does not belong. A field 206 stores a line start bit (to be referred to as an LS bit) indicating whether a pixel contained in the packet belongs to a line start position, that is, whether a pixel contained in the packet is contained in the start column of a page. The LS bit becomes "1" when a pixel contained in the packet belongs to the line start position, and "0" when it does not belong. A field 207 stores a line end bit (to be referred to as an LE bit) indicating whether a pixel contained in the packet belongs to a line end position, that is, whether a pixel contained in the packet is contained in the final column of a page. The LE bit becomes "1" when a pixel contained in the packet belongs to the line end position, and "0" when it does not belong. The above-described PS bit, PE bit, LS bit, and LE bit will be called pixel position attribute information at once. In the embodiment, an auxiliary region is added to an image acquired by the input unit 107, creating a page. The input unit 107 scans pixels from left to right on each line from the top to bottom of the page, and transfers image data to the communication unit 106 of the input management module 103 together with pixel position attribute information for each pixel. However, the present invention is applicable regardless of the image scanning direction. The communication unit 106 of the input management module 103 generates a packet based on the image data and pixel position attribute information received from the input unit 107, and transfers the packet to a subsequent module.

Figure 3:
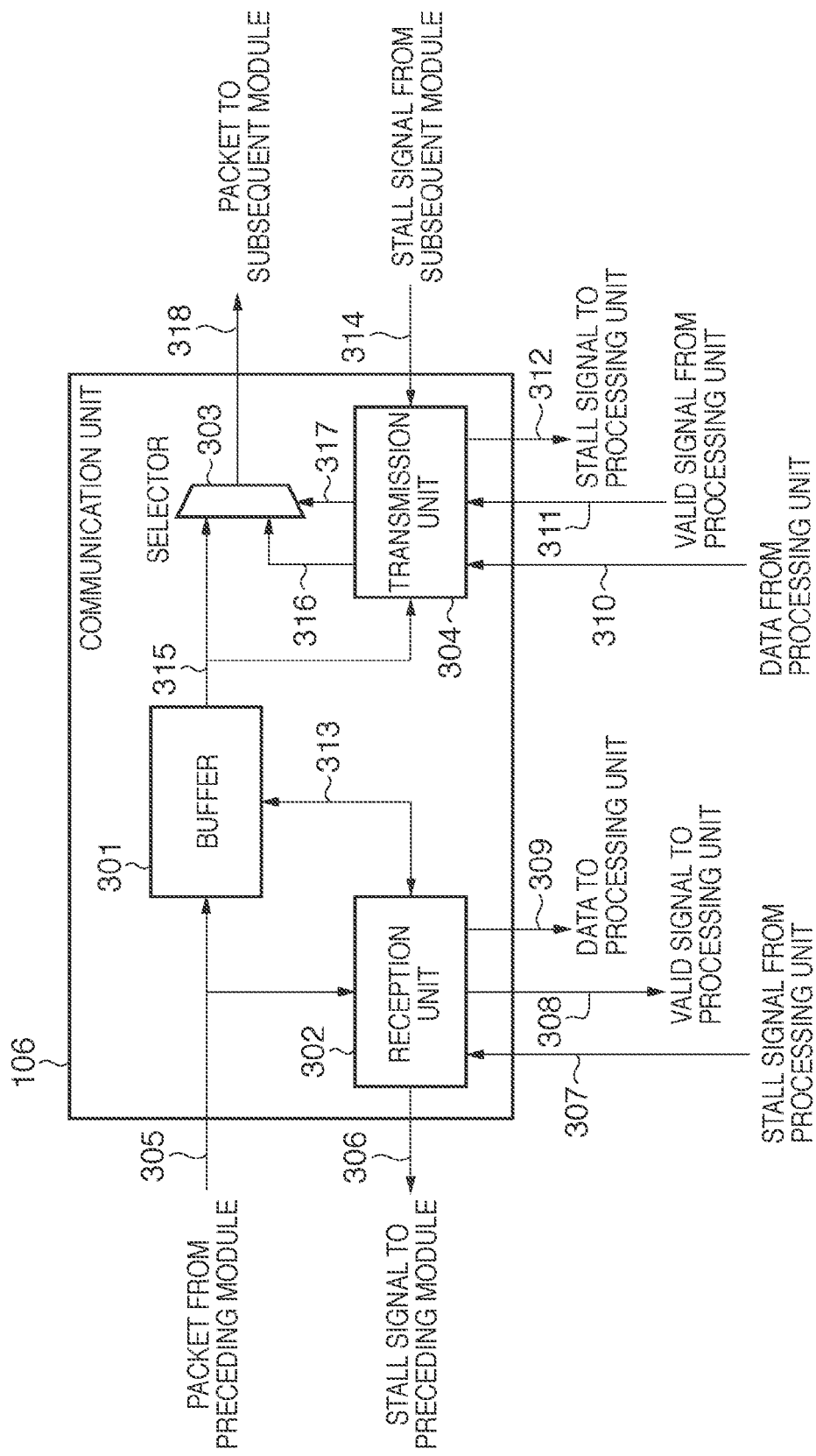
FIG. 3 is a block diagram showing the arrangement of a communication unit.

FIG. 3 is a block diagram exemplifying the arrangement of the communication unit 106 of the processing module 104. The communication unit 106 includes a buffer 301, reception unit 302, selector 303, and transmission unit 304. A packet transferred from a preceding module to the communication unit 106 via a data signal line 305 is input to both the buffer 301 and reception unit 302. The buffer 301 stores the packet transferred from the preceding module. The buffer 301 outputs the stored packet to both the selector 303 and transmission unit 304 via a data signal line 315. The buffer 301 also outputs the VALID bit in the stored packet to the reception unit 302 via a VALID signal line 313. The reception unit 302 determines whether the processing unit 108 in the same module should process image data in the packet transferred from the preceding module. That is, the reception unit 302 determines whether the VALID bit in the packet is valid and the transmission source ID in the packet matches the waiting ID of the communication unit 106. If the reception unit 302 determines to process the image data, it extracts the image data and pixel position attribute information from the packet, and transmits them to the processing unit 108 in the same module via a data signal line 309. At the same time, the reception unit 302 transmits a valid VALID signal to the processing unit 108 via a VALID signal line 308. Further, the reception unit 302 invalidates the VALID bit in the packet stored in the buffer 301 via the VALID signal line 313. Only when the VALID signal from the VALID signal line 308 is valid, the processing unit 108 receives the image data and pixel position attribute information from the reception unit 302, and processes them. The processing unit 108 performs image processing such as filter processing, updates the image data and pixel position attribute information, and returns them to the communication unit 106.

Also, the reception unit 302 receives a STALL signal from the processing unit 108 via a STALL signal line 307. When the STALL signal from the processing unit 108 is valid or the VALID bit of the packet stored in the buffer 301 is valid, the reception unit 302 transmits the valid STALL signal to the preceding module via a STALL signal line 306. This suppresses packet transfer from the preceding module.

The selector 303 selects either a packet from the buffer 301 or one from the transmission unit 304 based on a control signal received from the transmission unit 304 via a selector control signal line 317, and transfers the selected packet to a subsequent module via a data signal line 318. The selector selects a packet from the buffer 301 unless the control signal from the transmission unit 304 is valid.

The transmission unit 304 receives a VALID signal from the processing unit 108 via a VALID signal line 311. Only when the VALID signal is valid, the transmission unit 304 receives processed image data and pixel position attribute information from the processing unit 108 via a data signal line 310.

When the VALID bit of the packet in the buffer 301 is invalid and the VALID signal from the processing unit 108 is valid, the transmission unit 304 stores, in the packet, image data and pixel position attribute information received from the processing unit 108. At the same time, the transmission unit 304 transmits the packet to the selector 303 via a data signal line 316, and transmits a valid control signal to the selector 303 via the selector control signal line 317 in order to instruct the selector 303 to transmit the packet to a subsequent module. Also, the transmission unit 304 receives a STALL signal from the subsequent module via a STALL signal line 314. When the STALL signal from the subsequent module is valid, the transmission unit 304 transmits the valid STALL signal to the processing unit 108 via a STALL signal line 312. In addition, the transmission unit 304 suppresses packet transfer from the selector 303.

The communication unit 106 of the input management module 103 has the same arrangement as that shown in FIG. 3 except that the transmission unit 304 receives data from the input unit 107. The communication unit 106 of the output management module 102 has the same arrangement as that shown in FIG. 3 except that the reception unit 302 transmits data to the output unit 110. The communication unit 106 of the invalidation module 105 has the same arrangement as that shown in FIG. 3 except that it communicates not with the processing unit 108 but with the invalidation unit 109.

Figure 4:
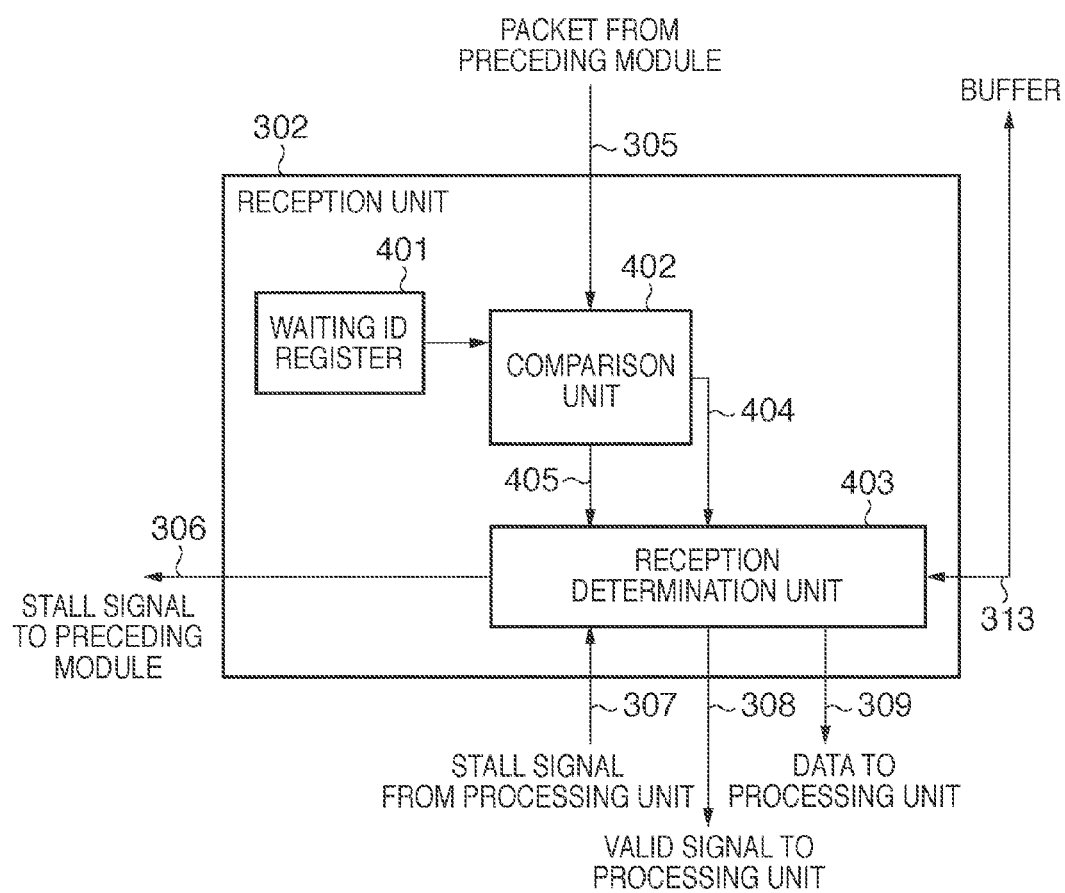
FIG. 4 is a block diagram showing the arrangement of a reception unit.

FIG. 4 is a block diagram exemplifying the arrangement of the reception unit 302. The reception unit 302 includes a waiting ID register 401, comparison unit 402, and reception determination unit 403. The waiting ID register 401 stores the above-described waiting ID. The comparison unit compares the waiting ID with a transmission source ID in a packet transferred from a preceding module.

When the transmission source ID matches the waiting ID, the comparison unit 402 transmits, to the reception determination unit 403 via a VALID signal line 405, the VALID bit in the packet received from the preceding module. At the same time, the comparison unit 402 transmits, to the reception determination unit 403 via a data signal line 404, image data and pixel position attribute information in the packet received from the preceding module.

When the STALL signal from the processing unit 108 is invalid, the reception determination unit 403 connects the VALID signal line 405 to the VALID signal line 308 and the data signal line 404 to the data signal line 309. Then, the reception determination unit 403 transmits an invalid VALID signal to the buffer 301 via the VALID signal line 313. That is, when the processing unit 108 processes data, the reception determination unit 403 invalidates the VALID bit of the packet stored in the buffer 301. In contrast, when the STALL signal from the processing unit 108 is valid, the reception determination unit 403 transmits a valid STALL signal to the preceding module via the STALL signal line 306.

Figure 5:
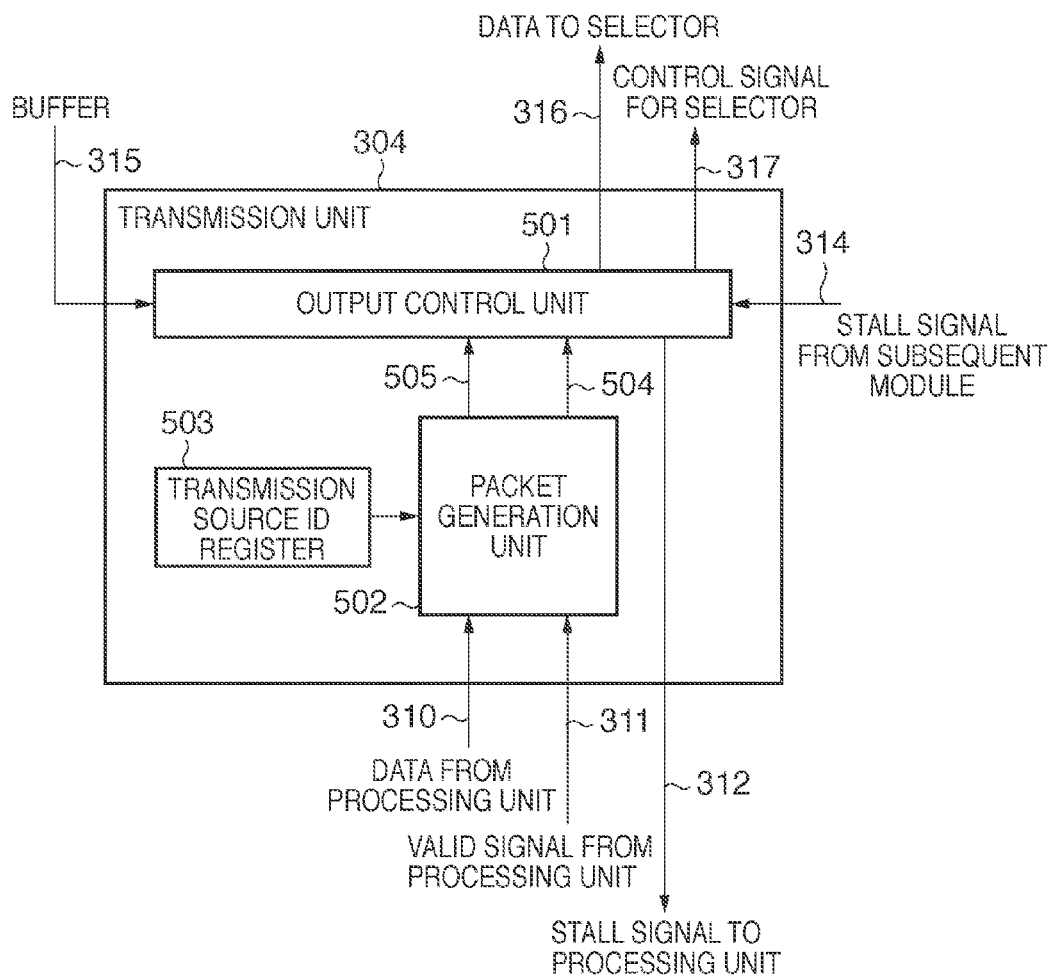
FIG. 5 is a block diagram showing the arrangement of a transmission unit.

FIG. 5 is a block diagram exemplifying the arrangement of the transmission unit 304. The transmission unit 304 includes an output control unit 501, packet generation unit 502, and transmission source ID register 503. The transmission source ID register 503 stores the aforementioned transmission source ID.

When the STALL signal from a subsequent module is valid, the output control unit 501 validates the STALL signal to the processing unit 108, suppressing output from the processing unit 108. Also, when the VALID signal from a VALID signal line 504 is valid, the STALL signal from the subsequent module is invalid, and the VALID bit in the buffer 301 is invalid, the output control unit 501 transmits a valid control signal to the selector 303. Further, the output control unit 501 connects a data signal line 505 to the data signal line 316. In the other cases, for example, when the VALID bit of the packet stored in the buffer 301 is valid, the output control unit 501 transmits an invalid control signal to the selector 303. Upon receiving the invalid control signal, the selector 303 transfers the packet stored in the buffer 301 to the subsequent module.

When the VALID signal from the processing unit 108 is valid, the packet generation unit 502 generates a packet in the internal buffer. The VALID bit in the field 201 of the generated packet stores "1" (valid). The field 202 stores a transmission source ID acquired from the transmission source ID register 503.

The field 203 stores processed image data acquired from the processing unit 108. The fields 204 to 207 store pixel position attribute information acquired from the processing unit 108. The packet generation unit 502 transmits the generated packet to the output control unit 501 via the data signal line 505, and the valid VALID signal to the output control unit 501 via the VALID signal line 504.

As described above, when data in a packet from a preceding module should be processed, the communication unit 106 extracts the data from the packet, causes the processing unit 108 to process it, stores the processed data in the packet, and transfers the packet to a subsequent module. To the contrary, when data in a packet from the preceding module should not be processed, the communication unit 106 directly transfers the packet to the subsequent module.

Figure 6:
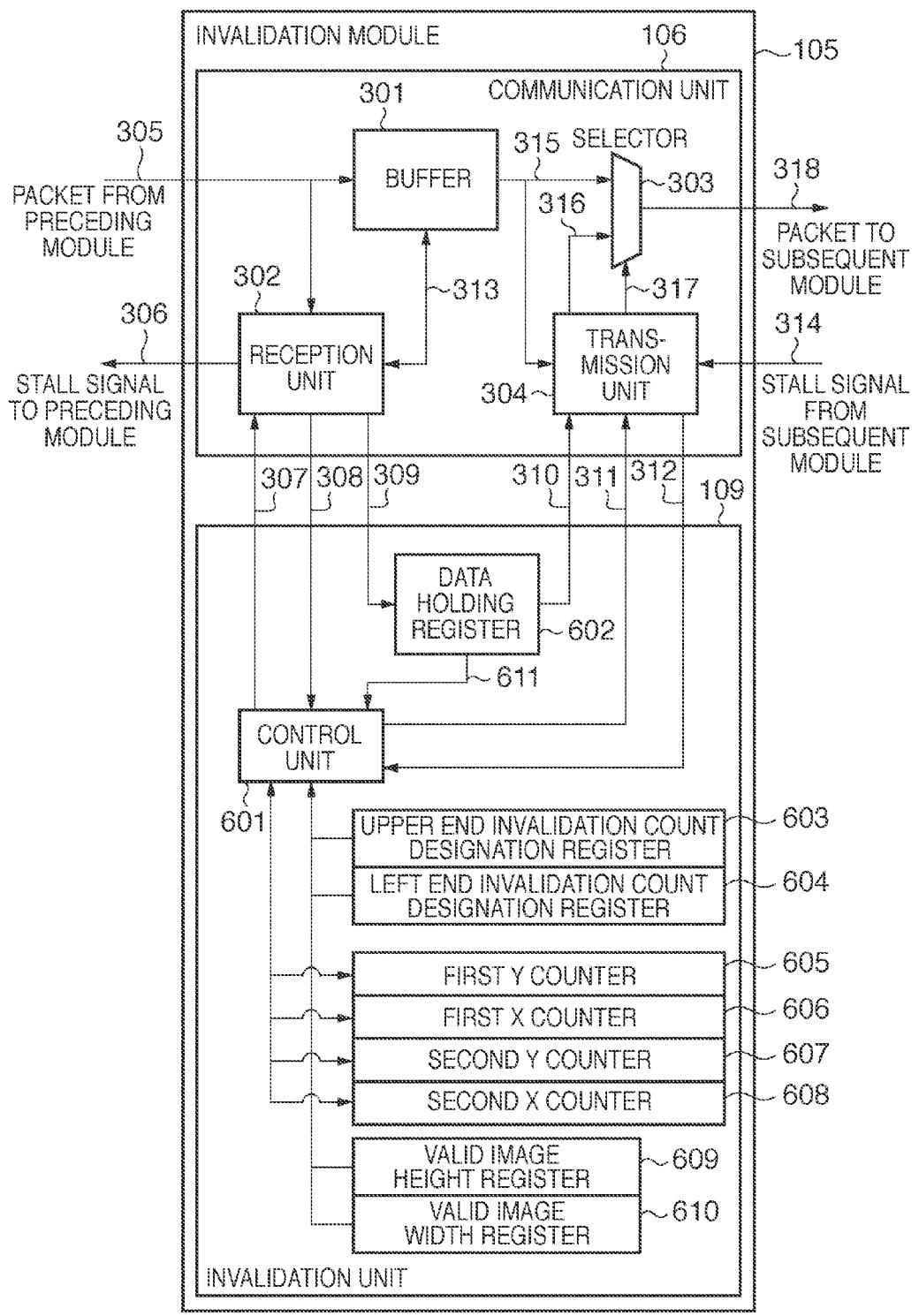
FIG. 6 is a block diagram showing the arrangement of an invalidation communication unit.

FIG. 6 is a block diagram exemplifying the arrangement of the invalidation module 105. The arrangement of the communication unit 106 has been described above, so a description thereof will not be repeated. The invalidation unit 109 includes a control unit 601, and various registers and counters to be described below. A data holding register 602 holds image data and pixel position attribute information from the reception unit 302. This register has a bit width enough to store image data and pixel position attribute information. An upper end invalidation count designation register 603 stores the number of pixels to be invalidated at the upper end of an image. A left end invalidation count designation register 604 stores the number of pixels to be invalidated at the left end of an image. A valid image height register 609 stores the height of an image to be output from the invalidation module 105. A valid image width register 610 stores the width of an image to be output from the invalidation module 105. The values of these registers are set prior to execution of pipeline processing. A first Y counter 605 and second Y counter 607 count the number of pixels in the vertical direction. A first X counter 606 and second X counter 608 count the number of pixels in the horizontal direction.

The control unit 601 controls the invalidation unit 109 and determines, in accordance with the values of the registers and counters, whether to transmit data held in the data holding register 602 to the transmission unit 304. The control unit 601 acquires pixel position attribute information from the data holding register 602 via a signal line 611, and modifies it in accordance with the values of the registers and counters. The control unit 601 stores the modified pixel position attribute information in the data holding register, and transmits a VALID signal to the communication unit 106. The data and pixel position attribute information stored in the data holding register 602 are transmitted to the transmission unit 304 via the data signal line 310.

Figure 7:
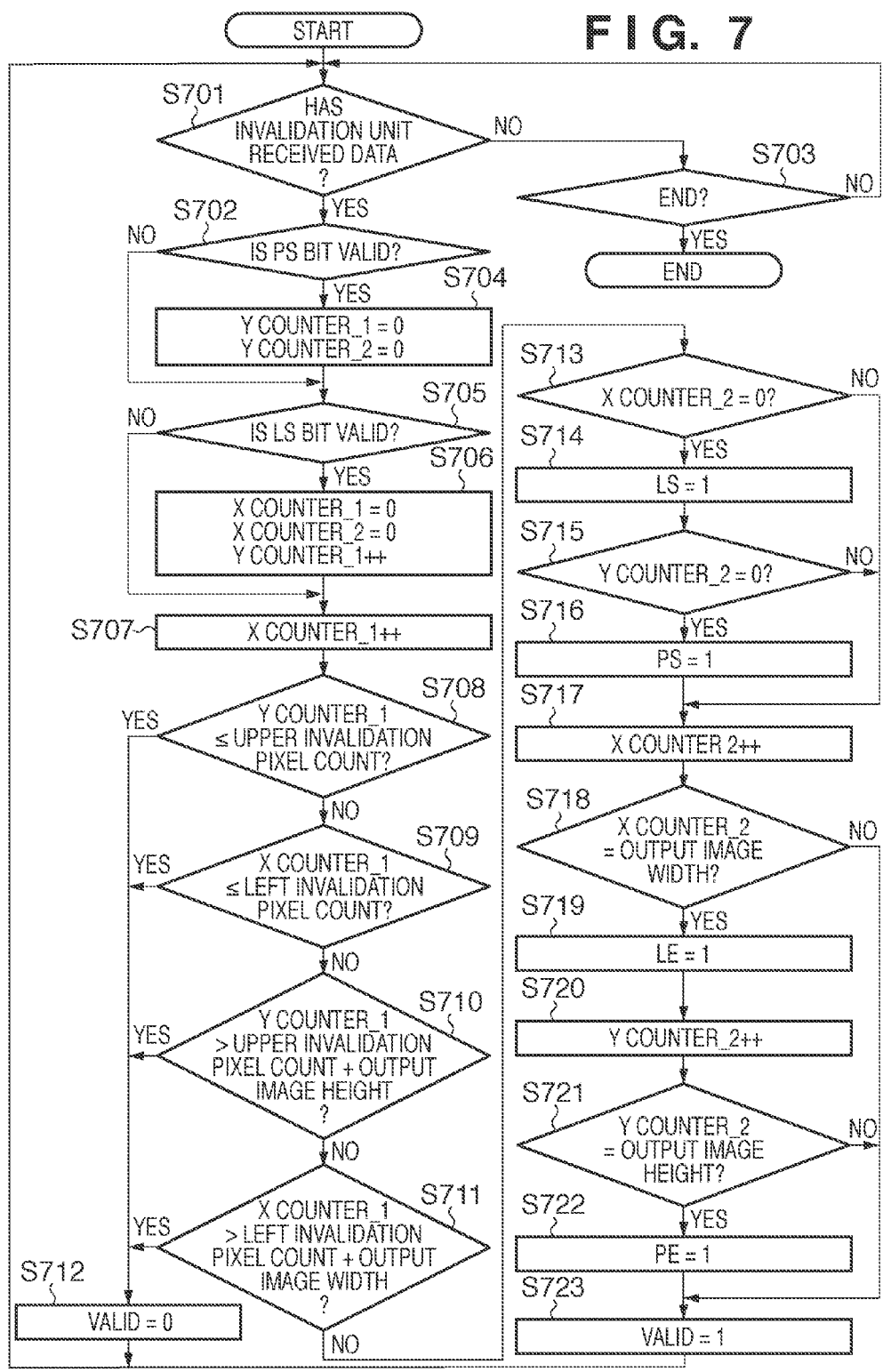
FIG. 7 is a flowchart showing processing in an invalidation unit.

The operation of the invalidation unit 109 will be explained with reference to the flowchart of FIG. 7. When the image processing apparatus 101 starts pipeline processing to process an image, the invalidation unit 109 operates in accordance with the following steps. In step S701, the control unit 601 determines whether a condition that the invalidation unit 109 has received image data and pixel position attribute information from the communication unit 106 is established. If the condition in step S701 is not established, the process shifts to step S703, and the control unit 601 determines whether processing of image data input to the image processing apparatus 101 has ended. If the control unit 601 determines in step S703 that processing of image data has ended, the processing of this flowchart ends. If the control unit 601 determines in step S703 that processing of image data has not ended, the process returns to step S701.

If the condition in step S701 is established, the received image data and pixel position attribute information are stored in the data holding register 602. In step S702, the control unit 601 determines whether the PS bit stored in the data holding register 602 is valid. If the PS bit is valid, the process shifts to step S704; if it is invalid, to step S705. In step S704, the control unit 601 initializes the value (Y counter_1) of the first Y counter 605 and the value (Y counter_2) of the second Y counter 607 to "0".

In step S705, the control unit 601 determines whether the LS bit stored in the data holding register 602 is valid. If the LS bit is valid, the process shifts to step S706; if it is invalid, to step S707. In step S706, the control unit 601 initializes the value (X counter_1) of the first X counter 606 and the value (X counter_2) of the second X counter 608 to "0", and increments the value of the first Y counter 605 by one. In step S707, the control unit 601 increments the value of the first X counter 606 by one. In step S708, the control unit 601 acquires an upper end invalidation pixel count from the upper end invalidation count designation register 603, and compares it with the value of the first Y counter 605. If the value of the first Y counter 605 is equal to or smaller than the upper end invalidation pixel count, the process shifts to step S712, and the control unit 601 transmits an invalid VALID signal to the communication unit 106. If the value of the first Y counter 605 is larger than the upper end invalidation pixel count, the process shifts to step S709.

In step S709, the control unit 601 acquires a left end invalidation pixel count from the left end invalidation count designation register 604, and compares it with the value of the first X counter 606. If the value of the first X counter 606 is equal to or smaller than the left end invalidation pixel count, the process shifts to step S712, and the control unit 601 transmits an invalid VALID signal to the communication unit 106. If the value of the first X counter 606 is larger than the left end invalidation pixel count, the process shifts to step S710.

In step S710, the control unit 601 acquires a valid image height from the valid image height register 609, and compares the sum of the upper end invalidation pixel count and valid image height with the value of the first Y counter 605. If the value of the first Y counter 605 is larger than the sum, the process shifts to step S712, and the control unit 601 transmits an invalid VALID signal to the communication unit 106. If the value of the first Y counter 605 is equal to or smaller than the sum, the process shifts to step S711.

In step S711, the control unit 601 acquires a valid image width from the valid image width register 610, and compares the sum of the left end invalidation pixel count and valid image width with the value of the first X counter 606. If the value of the first X counter 606 is larger than the sum, the process shifts to step S712, and the control unit 601 transmits an invalid VALID signal to the communication unit 106. If the value of the first X counter 606 is equal to or smaller than the sum, the process shifts to step S713.

In step S713, the control unit 601 determines whether a condition that the value of the second X counter 608 is 0 is established. This condition means that image data held in the data holding register 602 is one at the start position of one line in an image extracted from an input image by invalid pixels. If the condition in step S713 is established, the process shifts to step S714, and the control unit 601 sets "1" in the LS bit held in the data holding register 602. If the condition in step S713 is not established, the process shifts to step S717, and the control unit 601 increments the value of the second X counter 608 by one.

In step S715, the control unit 601 determines whether a condition that the value of the second Y counter 607 is 0 is established. This condition means that image data held in the data holding register 602 is one at a page start position in an image extracted from an input image by invalid pixels. If the condition in step S715 is established, the process shifts to step S716, and the control unit 601 sets "1" in the PS bit held in the data holding register 602. If the condition in step S715 is not established, the process shifts to step S717, and the control unit 601 increments the value of the second X counter 608 by one.

In step S718, the control unit 601 determines whether a condition that the value of the second X counter 608 equals the valid image width is established. This condition means that a pixel contained in image data held in the data holding register 602 is one at the end position of one line in an image extracted from an input image by invalid pixels. If the condition in step S718 is established, the process shifts to step S719, and the control unit 601 sets "1" in the LE bit held in the data holding register 602. In step S720, the control unit 601 increments the value of the second Y counter 607 by one. If the condition in step S718 is not established, the process shifts to step S723.

In step S721, the control unit 601 determines whether a condition that the value of the second Y counter 607 equals the valid image height is established. This condition means that a pixel contained in image data held in the data holding register 602 is one at a page end position in an image extracted from an input image by invalid pixels. If the condition in step S721 is established, the process shifts to step S722, and the control unit 601 sets "1" in the PE bit held in the data holding register 602. If the condition in step S721 is not established, the process shifts to step S723.

In step S723, the control unit 601 transmits a valid VALID signal to the communication unit 106. After that, the process returns to step S701.

Figure 8:
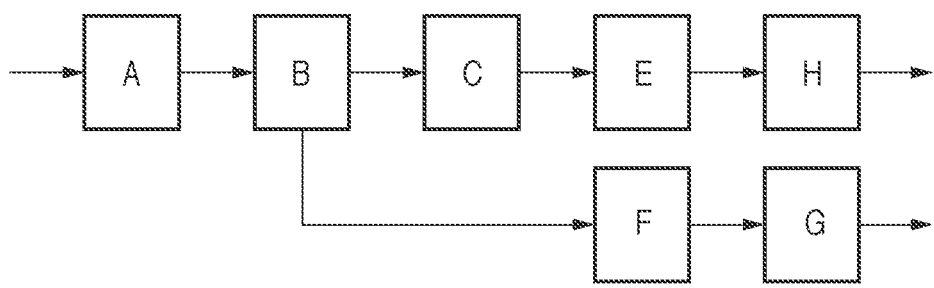
FIG. 8 is a view exemplifying the structure of branch flows in an embodiment.

For example, as shown in FIG. 8, pipeline processing for image data in this case is achieved by the first pipeline processing by the modules A, B, C, E, and H that forms the first processing flow, and the second pipeline processing by the modules F and G that forms the second processing flow. In this pipeline processing, the module B outputs image data having the number of pixels corresponding to the first size. The module F targets image data having the number of pixels corresponding to the first size, and the module E targets image data having the number of pixels corresponding to the second size smaller than the first size. That is, the module F processes image data for every first size, and the module E processes image data for every second size. In this case, the module C serving as an invalidation module is arranged on the preceding stage of the module E. The module C transfers, to the module E, image data of the second size obtained by deleting an unnecessary part of the auxiliary region of image data. As a result, processed data can be efficiently transferred to processing modules on the respective branch flows, implementing desired image processing.

In the above-described embodiment, the invalidation module is arranged midway along the processing flow to reduce the auxiliary region so as to optimize the number of pixels of a transferred image. This enables transferring image data having auxiliary regions of different sizes for respective branch flows. The following embodiment will describe an example in which the communication unit reduces the auxiliary region to transfer data to the processing unit.

Figure 9:
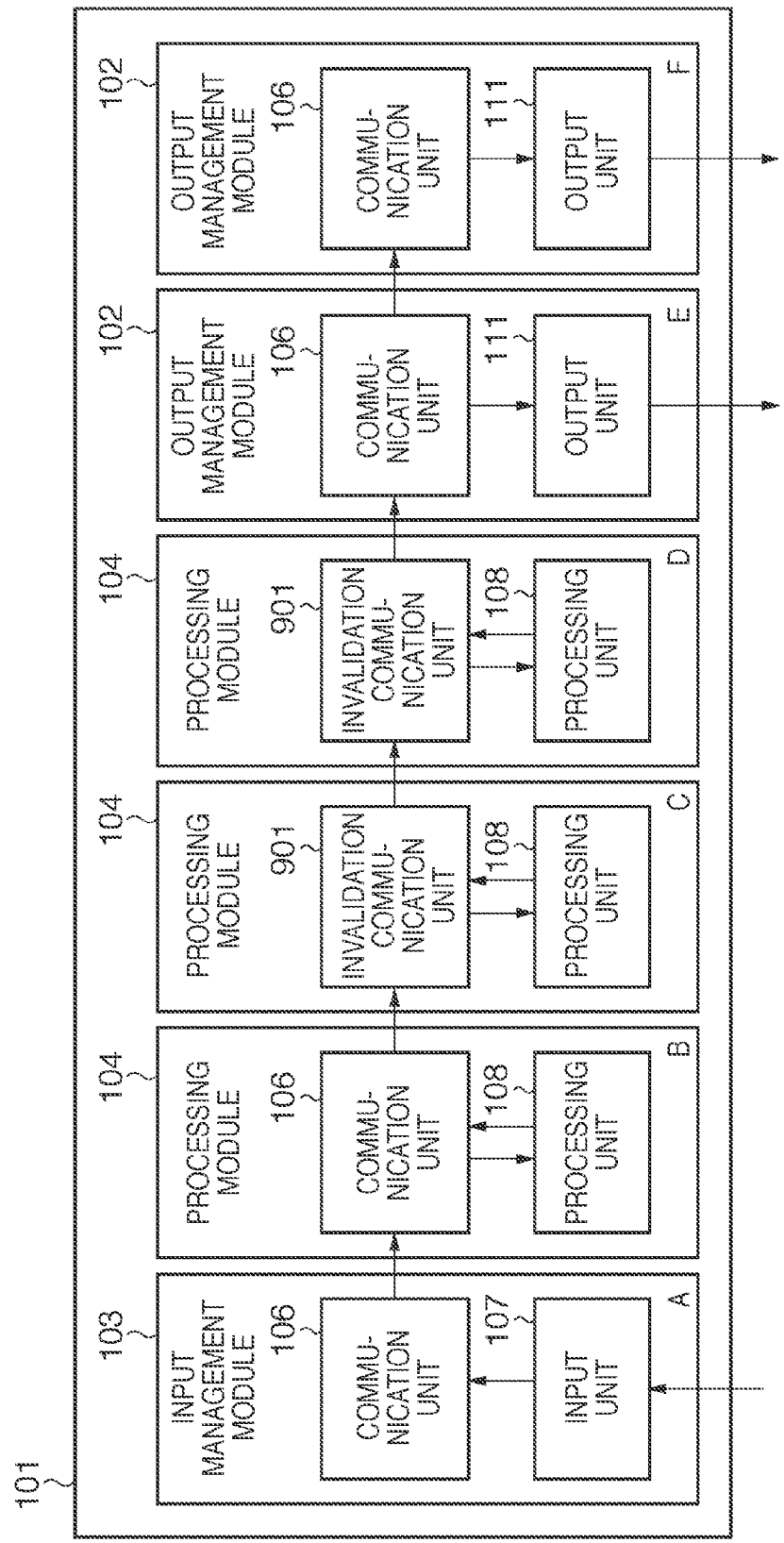
FIG. 9 is a block diagram showing the arrangement of an image processing apparatus in another embodiment.
Figure 10:
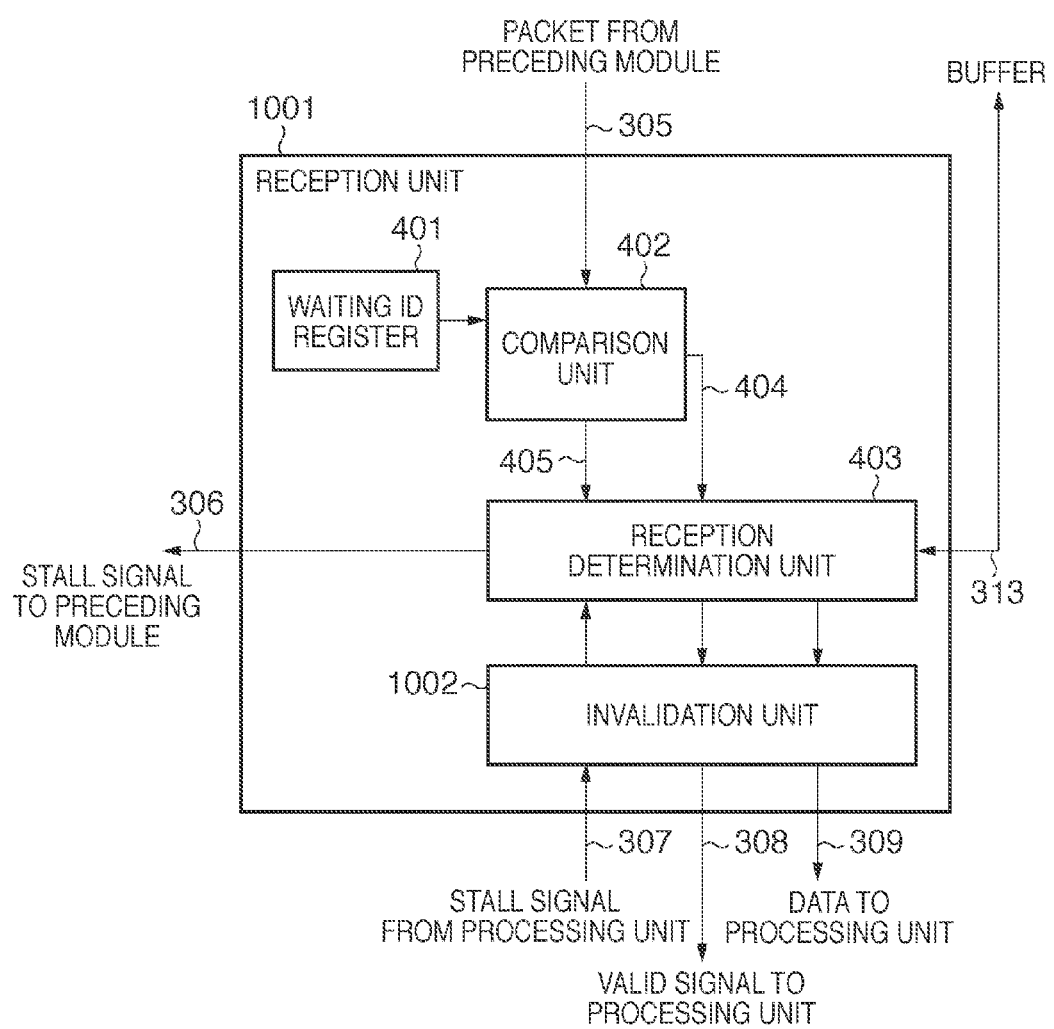
FIG. 10 is a block diagram showing the arrangement of the reception unit of an invalidation communication unit.

This embodiment will be explained with reference to FIGS. 9 to 11F. FIG. 9 is a block diagram exemplifying the arrangement of an image processing apparatus 101 according to the embodiment. The same reference numerals as those in FIG. 1 denote the same parts, and a repetitive description thereof will be omitted. In the image processing apparatus 101 of the embodiment, at least some processing modules 104 include invalidation communication units 901 instead of the communication units 106. The invalidation communication unit 901 deletes an unnecessary part of the auxiliary region and then transfers data to the processing unit. The invalidation communication unit 901 includes a reception unit 1001 shown in FIG. 10 instead of the reception unit 302, unlike the communication unit 106. The reception unit 1001 further includes an invalidation unit 1002, unlike the reception unit 302. The invalidation unit 1002 has the same arrangement as that of the invalidation unit 109.

According to the arrangement of this embodiment, as shown in FIG. 11A, pipeline processing for image data in this case is achieved by processes performed by the modules A, B, C, and E that form the first processing flow, and processes performed by the modules D and F that form the second processing flow. Even when the modules C and D require auxiliary regions of different sizes, image data having auxiliary regions of necessary sizes can be transferred to processing units 108 of both the modules C and D because the modules C and D include the invalidation communication units 901. Hence, image data of appropriate sizes can be efficiently transferred, performing desired image processing.

When the invalidation communication unit 901 need not perform invalidation, "0" is designated as the values of an upper end invalidation count designation register 603 and left end invalidation count designation register 604. It suffices to set, in a valid image height register 609 and valid image width register 610, the height and width of an image output from a preceding module to the processing unit.

Figure 11B:
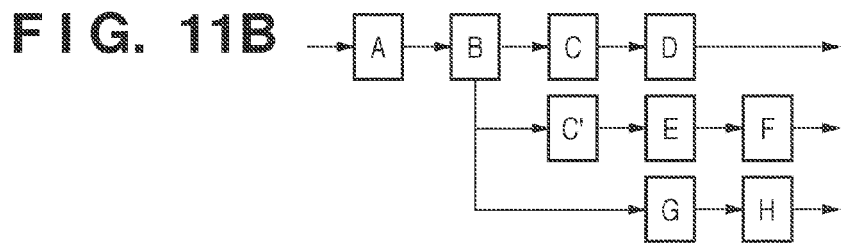

The above-described embodiments have described an example in which the processing flow is diverted midway into two. The following embodiment will describe an example in which the processing flow is diverted midway into three or more. For example, a case in which the processing flow is diverted from the processing module B into three, toward the processing modules D, E, and G, and the case wherein processing modules D, E, and G require auxiliary regions of different sizes will be examined. Assume that the processing module D requires the largest auxiliary region. In this case, as shown in FIG. 11B, invalidation modules C and C' are arranged on the preceding stages of the modules D and E, respectively. That is, the invalidation module is arranged as the first module in each branch flow. An input module A adds an auxiliary region to an input image so that an image output from the processing module B has an auxiliary region of a size necessary for the processing module G. The two invalidation modules C and C' delete unnecessary parts of the auxiliary region, outputting images having auxiliary regions necessary for the processing modules D and E. Desired processes can therefore be done in all the three branch flows.

Figure 11C:
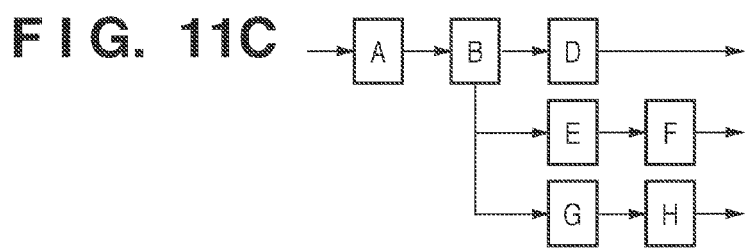

As shown in FIG. 11C, each of the processing modules D and E may have the invalidation communication unit 901 in the above-described embodiment, instead of arranging the invalidation module. Also in this case, desired processes can be performed in all the three branch flows.

The embodiment has described an example having three branches. However, desired processes can also be done regardless of the number of branches. More specifically, a branch flow requiring an auxiliary region of a maximum size is specified among all branch flows. Then, the invalidation modules or invalidation communication units 901 are arranged in processing flows except for the specified processing flow.

The embodiments have explained an example in which the processing flow is diverted midway. The following embodiment will describe an example in which processing flows are merged midway. In this embodiment, similar to the above-described embodiments, the packet has a structure as shown in FIG. 2. In this specification, both the diversion and merge of a processing flow are called the branch of a processing flow.

Figure 11D:
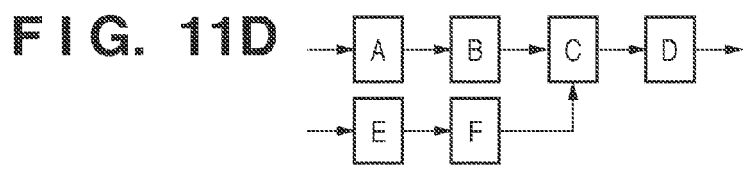
Figure 11E:
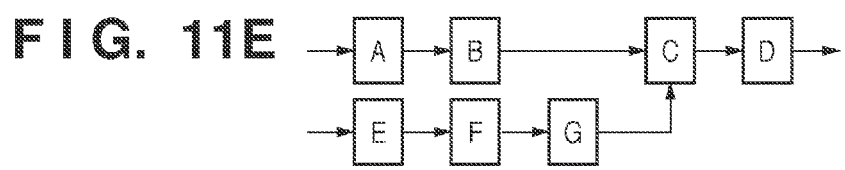

For example, when performing composition processing or the like in image processing, two processing flows need to be merged midway. For example, as shown in FIG. 11D, the second processing flow formed from processes by the modules E and F is merged in the module C with the first processing flow formed from processes by the modules A, B, C, and D. Assume that the number of pixels of image data output from the processing module B is smaller than that of pixels of image data output from the processing module F. In this case, if nothing is done, the module C has to process image data having different numbers of pixels.

Figure 18A:
FIGS. 18A and 18B are views showing reference examples of a signal flow graph.
Figure 18B:
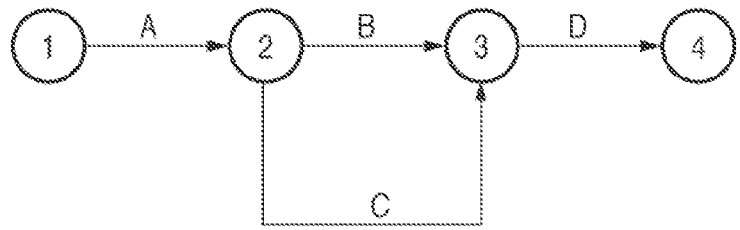
Figure 19:
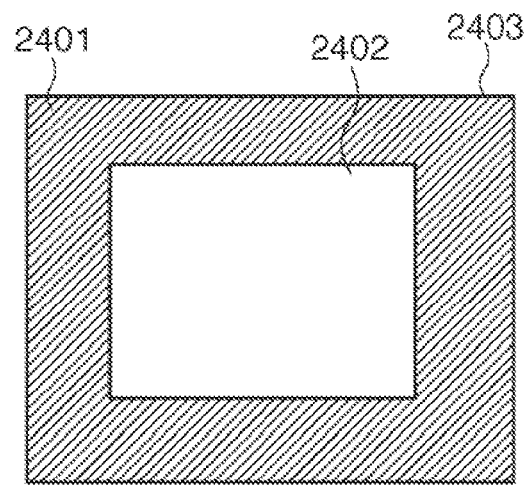
FIG. 19 is a view exemplifying an auxiliary region.
Figure 20B:
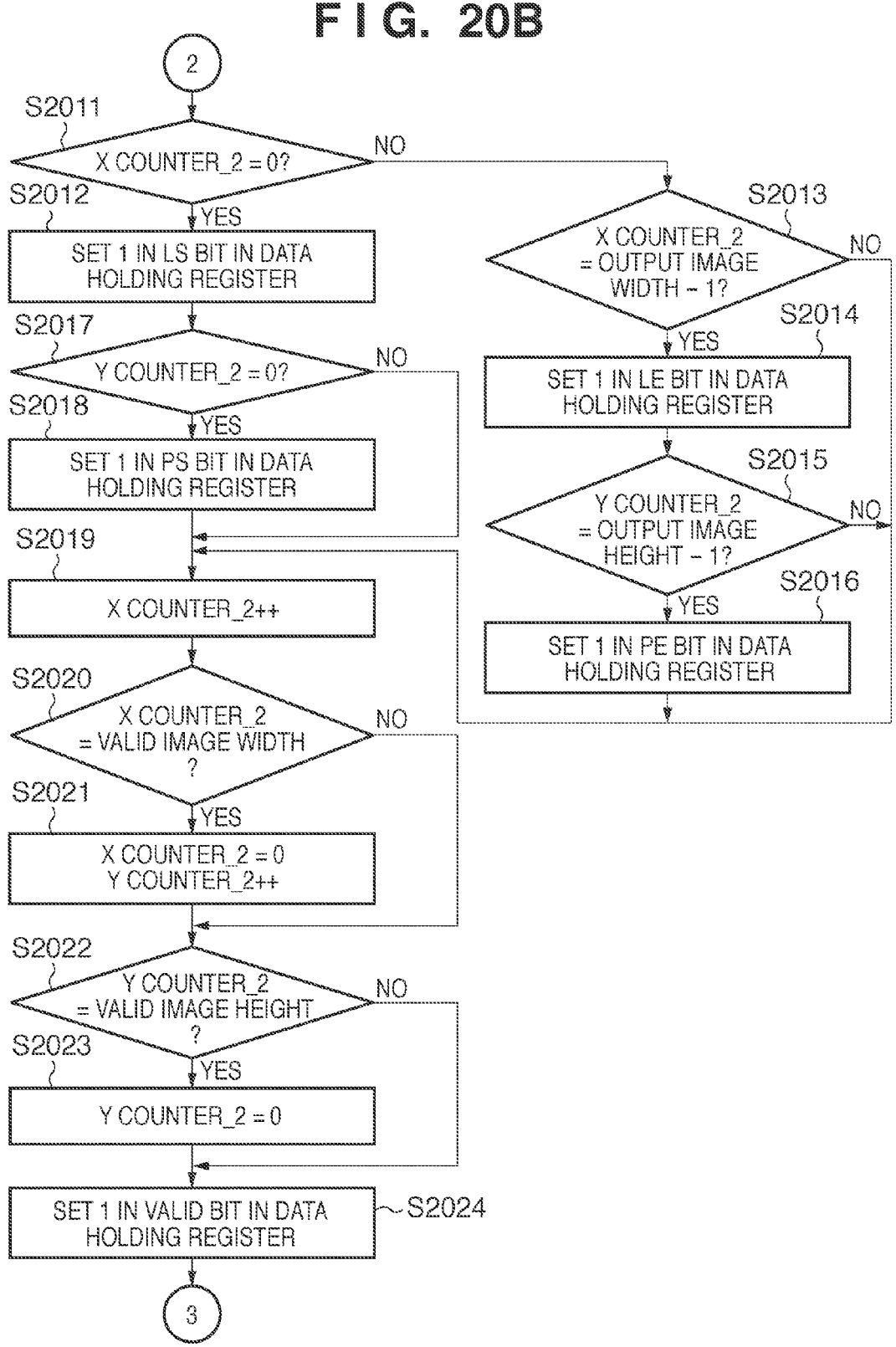

In this case, an invalidation module G can be arranged on the subsequent stage of the processing module F to invalidate an unnecessary part of the auxiliary region of image data output from the processing module F. That is, the invalidation module G is arranged as the final module on the branch flow. Further, the diversion of a processing flow shown in FIG. 11A and the merge of a processing flow shown in FIG. 11D may be combined. In other words, the second processing flow diverted from the first processing flow may be merged again with the first processing flow. In this case, the number of pixels of image data that has been changed at the start of the second processing flow is changed again at the end of the second processing flow. With this arrangement, even processing by the module C in FIG. 18B, which is difficult in the prior art, can be executed without any problem.

As described above, even when the second processing flow is merged with the first processing flow, desired image processing can be done. That is, even when image sizes obtained from respective branch flows are different, an invalidation module is arranged in at least either processing flow to change the number of pixels of an image to be received by a subsequent module. Data can be transferred efficiently to a model at the merge end.

The embodiments have explained an example in which the invalidation unit deletes an unnecessary part of the auxiliary region when the processing flow is diverted or processing flows are merged. In the following embodiment, an addition module is added to the pipeline. The addition module generates an auxiliary region necessary for processing in a subsequent module and transfers, to the subsequent module, image data obtained by adding the auxiliary region around an image. In this embodiment, the packet has a structure as shown in FIG. 2.

Figure 12:
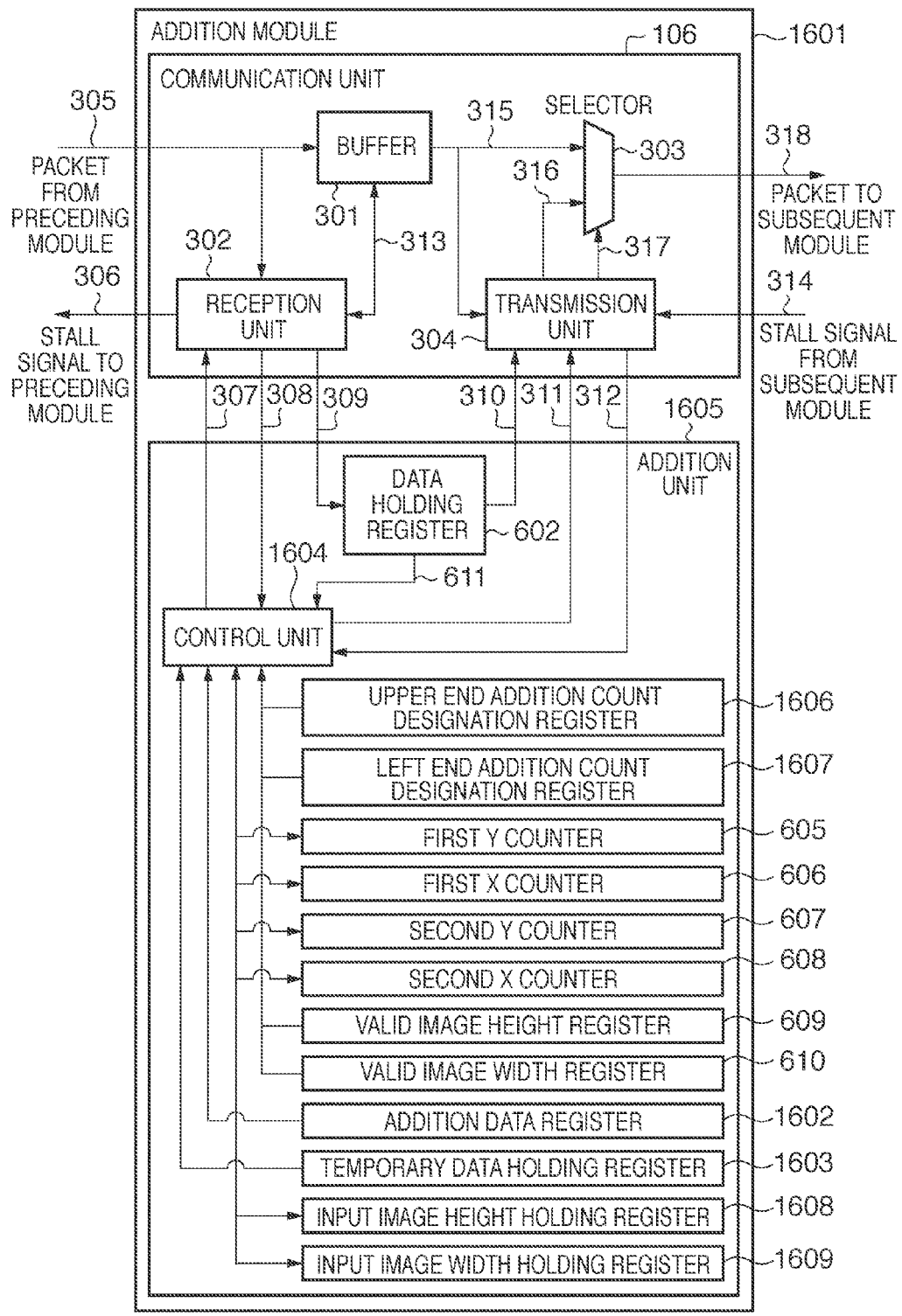
FIG. 12 is a block diagram showing the arrangement of an addition module in another embodiment.

The overall arrangement in this embodiment is the same as that in FIG. 1 in the above-described embodiments. An image processing apparatus includes an addition module 1601 instead of the invalidation module 105. FIG. 12 shows the arrangement of the addition module 1601 in this embodiment. The same reference numerals as those in the invalidation module 105 denote the same components of the addition module 1601, and a repetitive description thereof will be omitted.

An addition data register 1602 stores a value used as a pixel value when generating an auxiliary region. A temporary data holding register 1603 temporarily holds image data in a packet received from a preceding module. A control unit 1604 controls each processing of an addition unit 1605.

An upper end addition count designation register 1606 stores the number of pixels of the auxiliary region to be added at the upper end of an image. A left end addition count designation register 1607 stores the number of pixels of the auxiliary region to be added at the left end of an image. The temporary data holding register 1603 has a maximum bit width enough to store a packet. Note that the temporary data holding register may store the VALID bit, transmission source ID, PS bit, PE bit, LS bit, and LE bit in the packet. The addition unit 1605 generates an auxiliary region necessary for the top, bottom, right, and left of an image in accordance with the values of the registers and counters, adds it to the image, and transfers the resultant image to a subsequent module. An input image height holding register 1608 stores the height of an image input to the addition unit 1605. An input image width holding register 1609 stores the width of an image input to the addition unit 1605. The addition unit 1605 does not change image data contained in a valid region corresponding to image data input to the image processing apparatus 101 out of image data input from a preceding module. The addition unit 1605 outputs image data obtained by adding a new auxiliary region to the auxiliary region positioned around the valid region.

Figure 13:
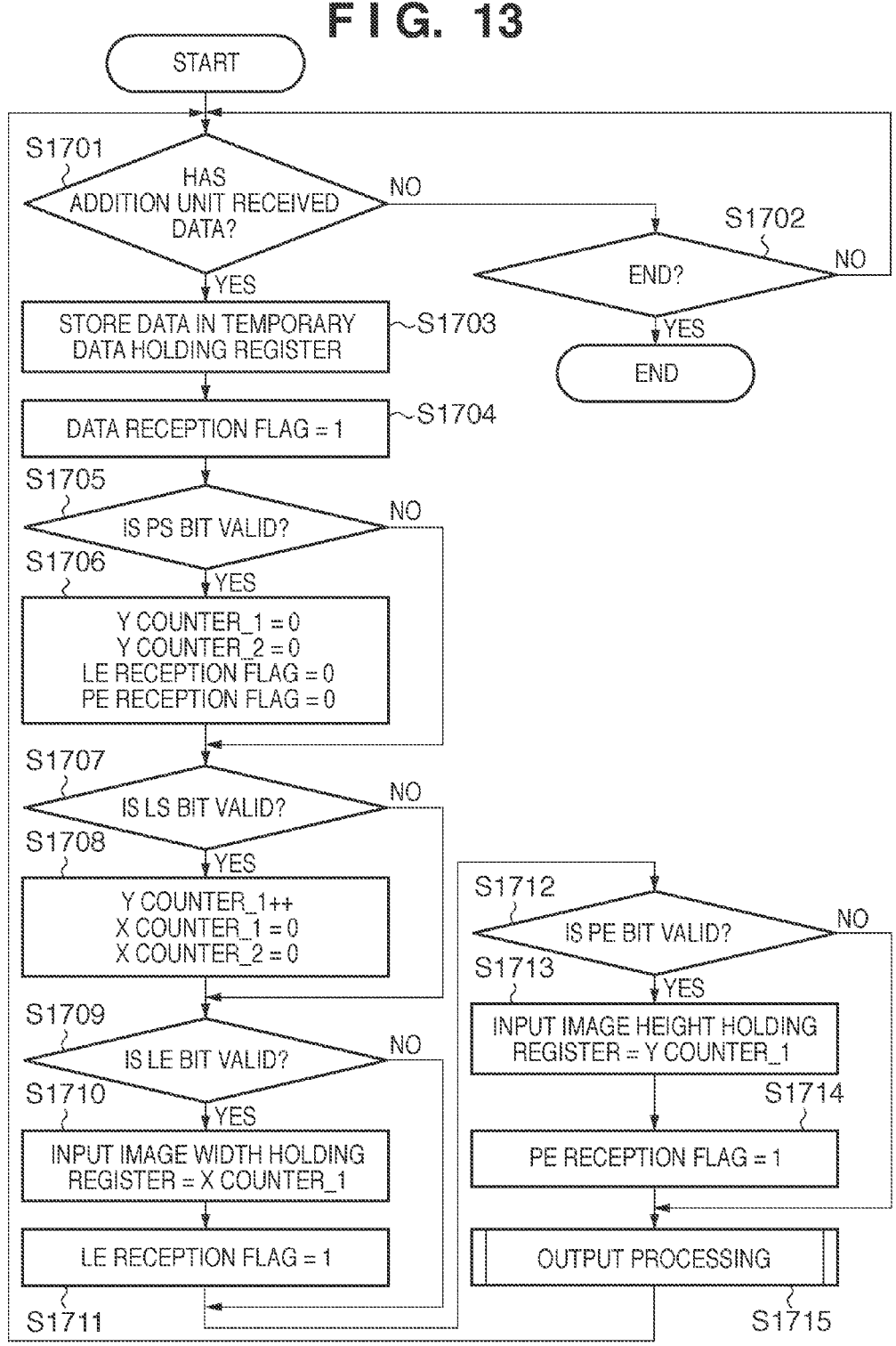
FIG. 13 is a flowchart showing processing in an addition unit in still another embodiment.

The operation of the addition unit 1605 will be explained with reference to the flowchart of FIG. 13. The values of a first Y counter 605, first X counter 606, second Y counter 607, and second X counter 608 will be called a Y counter_1, X counter_1, Y counter_2, and X counter_2, respectively.

When pipeline processing starts, the addition unit 1605 executes processing in accordance with the following steps. In step S1701, the control unit 1604 determines whether the addition unit 1605 has received data and pixel position attribute information from a communication unit 106. If the control unit 1604 determines that the addition unit 1605 has not received data and pixel position attribute information, the process shifts to step S1702, and the control unit 1604 determines whether processing of input image data has ended. If the control unit 1604 determines in step S1702 that processing of image data has ended, the processing of this flowchart ends. If the control unit 1604 determines in step S1702 that processing of image data has not ended, the process returns to step S1701. If the control unit 1604 determines in step S1701 that the addition unit 1605 has received data and pixel position attribute information, the received data and pixel position attribute information are stored in a data holding register 602.

In step S1703, the control unit 1604 stores data of a received packet in the temporary data holding register 1603. Data temporarily stored in the temporary data holding register 1603 contains the VALID bit, transmission source ID, PS bit, PE bit, LS bit, and LE bit in addition to image data, but some or all of them may not be contained.

In step S1704, the control unit 1604 sets "1" in a data reception flag serving as a flag indicating whether the temporary data holding register 1603 stores data.

In step S1705, the control unit 1604 determines whether the PS bit stored in the data holding register 602 is valid. If the PS bit is valid, the process shifts to step S1706. The control unit 1604 initializes, to "0", the first Y counter 605 serving as a counter which manages the vertical input image position of data, the second Y counter 607 serving as a counter which manages the vertical output image position, the LE reception flag, and the PE reception flag. Then, the process shifts to step S1707. If the PS bit is invalid in step S1705, the process shifts to step S1707.

In step S1707, the control unit 1604 determines whether the LS bit stored in the data holding register 602 is valid. If the LS bit is valid, the process shifts to step S1708. The control unit 1604 increments the value of the first Y counter 605 by one, and initializes, to "0", the value of the first X counter 606 serving as a counter which manages the horizontal input image position of data, and that of the second X counter 608 serving as a counter which manages the horizontal output image position, respectively. After that, the process shifts to step S1709. If the LS bit is invalid in step S1707, the process shifts to step S1709.

In step S1709, the control unit 1604 determines whether the LE bit stored in the data holding register 602 is valid. If the LE bit is valid, the process shifts to step S1710. The control unit 1604 substitutes the value of the first X counter 606 into the input image width holding register 1609 which holds an input image width for the addition unit 1605. In step S1711, the control unit 1604 sets "1" in the LE reception flag, and the process shifts to step S1712. If the LE bit is invalid in step S1709, the process shifts to step S1712.

In step S1712, the control unit 1604 determines whether the PE bit stored in the data holding register 602 is valid. If the PE bit is valid, the process shifts to step S1713. The control unit 1604 substitutes the value of the first Y counter 605 into the input image height holding register 1608 which holds an input image height for the addition unit 1605. In step S1714, the control unit 1604 sets "1" in the PE reception flag, and the process shifts to step S1715. If the LE bit is invalid in step S1712, the process shifts to step S1715.

Step S1715 is output processing, which will be explained with reference to FIGS. 20A to 20D. In step S2001, the control unit 1604 sets "0" in the STALL flag, and the process shifts to step S2002. In step S2002, the control unit 1604 determines whether a condition that the value of the upper end addition count designation register 1606 is larger than that of the second Y counter 607 is established. If the condition in step S2002 is established, the process shifts to step S2006. If the condition in step S2002 is not established, the process shifts to step S2003.

In step S2003, the control unit 1604 determines whether a condition that the value of the left end addition count designation register 1607 is larger than that of the second X counter 608 is established. If the condition in step S2003 is established, the process shifts to step S2006. If the condition in step S2003 is not established, the process shifts to step S2004.

In step S2004, the control unit 1604 determines whether a condition that the sum of the values of the first Y counter 605 and upper end addition count designation register 1606 is equal to or smaller than the value of the second Y counter 607 is established. If the condition in step S2004 is established, the process shifts to step S2006. If the condition in step S2004 is not established, the process shifts to step S2005.

In step S2005, the control unit 1604 determines whether a condition that the sum of the values of the first X counter 606 and left end addition count designation register 1607 is equal to or smaller than the value of the second X counter 608 is established. If the condition in step S2005 is established, the process shifts to step S2006. If the condition in step S2005 is not established, the process shifts to step S2008.

In step S2008, the control unit 1604 overwrites the data holding register 602 with data of the temporary data holding register 1603. In step S2009, the control unit 1604 sets "0" in the data reception flag, and the process shifts to step S2010.

In step S2006, the control unit 1604 overwrites the data holding register 602 with the value of the addition data register 1602. In step S2007, the control unit 1604 sets "1" in the STALL flag, and the process shifts to step S2010.

In step S2010, the control unit 1604 sets "0" in the PS bit, PE bit, LS bit, and LE bit in the data holding register 602, respectively. In step S2011, the control unit 1604 determines whether a condition that the value of the second X counter 608 is 0 is established. If the condition in step S2011 is established, the process shifts to step S2012; if NO, to step S2013. In step S2012, the control unit 1604 sets "1" in the LS bit in the data holding register 602, and the process shifts to step S2017. In step S2017, the control unit 1604 determines whether a condition that the value of the second Y counter 607 is 0 is established. If the condition in step S2017 is established, the process shifts to step S2018; if NO, to step S2019. In step S2018, the control unit 1604 sets "1" in the PS bit in the data holding register 602, and the process shifts to step S2019.

In step S2013, the control unit 1604 determines whether a condition that the value of the second X counter 608 equals a value obtained by decrementing the value of a valid image width register 610 by one is established. If the condition in step S2013 is established, the process shifts to step S2014, and the control unit 1604 sets "1" in the LE bit in the data holding register 602. If the condition in step S2013 is not established, the process shifts to step S2019.

In step S2015, the control unit 1604 determines whether a condition that the value of the second Y counter 607 equals a value obtained by decrementing the value of a valid image height register 609 by one is established. If the condition in step S2015 is established, the process shifts to step S2016, and the control unit 1604 sets "1" in the PE bit in the data holding register 602. If the condition in step S2015 is not established, the process shifts to step S2019. In step S2019, the control unit 1604 increments the value of the second X counter 608.

In step S2020, the control unit 1604 determines whether a condition that the value of the second X counter 608 equals the value of the valid image width register 610 is established. If the condition in step S2020 is established, the process shifts to step S2021, and the control unit 1604 initializes the value of the second X counter 608 to "0", and increments the value of the second Y counter 607 by one. If the condition in step S2020 is not established, the process shifts to step S2022.

In step S2022, the control unit 1604 determines whether a condition that the value of the second Y counter 607 equals the value of the valid image height register 609 is established. If the condition in step S2022 is established, the process shifts to step S2023, and the control unit 1604 initializes the value of the second Y counter 607 to "0". If the condition in step S2022 is not established, the process shifts to step S2024.

In step S2024, the control unit 1604 sets "1" in the VALID bit in the data holding register 602. In step S2025, the control unit 1604 instructs the communication unit 106 to store, in the packet, data stored in the data holding register 602 and transfer the packet to a subsequent module. Then, the process shifts to step S2026.

In step S2026, the control unit 1604 determines whether a condition that the data reception flag is "1" is established. If the condition in step S2026 is established, the process shifts to step S2027. In step S2027, the control unit 1604 sets "1" in the STALL flag. If the condition in step S2026 is not established, the process shifts to step S2028.

In step S2028, the control unit 1604 determines whether a condition that the LE reception flag is "1" is established. If the condition in step S2028 is established, the process shifts to step S2029. In step S2029, the control unit 1604 determines whether a condition that the result of subtracting the sum of the values of the input image width holding register 1609 and left end addition count designation register 1607 from the value of the valid image width register 610 is larger than 0 is established. If the condition in step S2029 is established, the process shifts to step S2030. In step S2030, the control unit 1604 determines whether a condition that the value of the second X counter 608 is larger than the result of adding the value of the left end addition count designation register 1607 to the result of decrementing the value of the input image width holding register 1609 by one is established. If the condition in step S2030 is established, the process shifts to step S2031. In step S2031, the control unit 1604 sets "1" in the STALL flag. If one of the conditions in steps S2028, S2029, and S2030 is not established, the process shifts to step S2032.

In step S2032, the control unit 1604 determines whether a condition that the LE bit in the data holding register 602 is "1" is established. If the condition in step S2032 is established, the process shifts to step S2033, and the control unit 1604 sets "0" in the STALL flag. Thereafter, the process shifts to step S2034.

In step S2034, the control unit 1604 determines whether a condition that the PE reception flag is "1" is established. If the condition in step S2034 is established, the process shifts to step S2035. In step S2035, the control unit 1604 determines whether a condition that the result of subtracting the sum of the values of the input image height holding register 1608 and upper end addition count designation register 1606 from the value of the valid image height register 609 is larger than "0" is established. If the condition in step S2035 is established, the process shifts to step S2036. In step S2036, the control unit 1604 determines whether a condition that the value of the second Y counter 607 is larger than the result of adding the value of the upper end addition count designation register 1606 to the result of decrementing the value of the input image height holding register 1608 by one is established. If the condition in step S2036 is established, the process shifts to step S2037. In step S2037, the control unit 1604 sets "1" in the STALL flag. If one of the conditions in steps S2034, S2035, and S2036 is not established, the process shifts to step S2038.

In step S2038, the control unit 1604 determines whether a condition that the PE bit in the data holding register 602 is "1" is established. If the condition in step S2038 is established, the process shifts to step S2039. In step S2039, the control unit 1604 sets "1" in the STALL flag, and the process shifts to step S2040. If the condition in step S2038 is not established, the process shifts to step S2040.

In step S2040, the control unit 1604 determines whether a condition that the STALL flag is "1" is established. If the condition in step S2040 is established, the process shifts to step S2041. In step S2041, the control unit 1604 transmits a valid STALL signal to the communication unit 106. The communication unit 106 transfers the STALL signal to a preceding module, so the preceding module temporarily stops packet transfer. After that, the process shifts to step S2001. If the condition in step S2040 is not established, the process ends.

In the above example of FIG. 8, assume that the number of pixels of image data necessary for the processing module E is larger than that of pixels of image data necessary for the processing module F. In this case, an addition module can be arranged as the module C to change image data transferred from the processing module B into those having numbers of pixels suited to processes by the processing units of both the modules E and F. Hence, processed data can be efficiently transferred to processing modules on branch flows, implementing desired image processing.

In the embodiment described with reference to FIG. 12, the addition module is arranged midway along the processing flow, and adds an auxiliary region to optimize the number of pixels of a transferred image, thereby transferring image data having auxiliary regions of different sizes for respective branch flows. The following embodiment will describe an example in which the communication unit adds an auxiliary region to transfer data to the processing unit.

Figure 14:
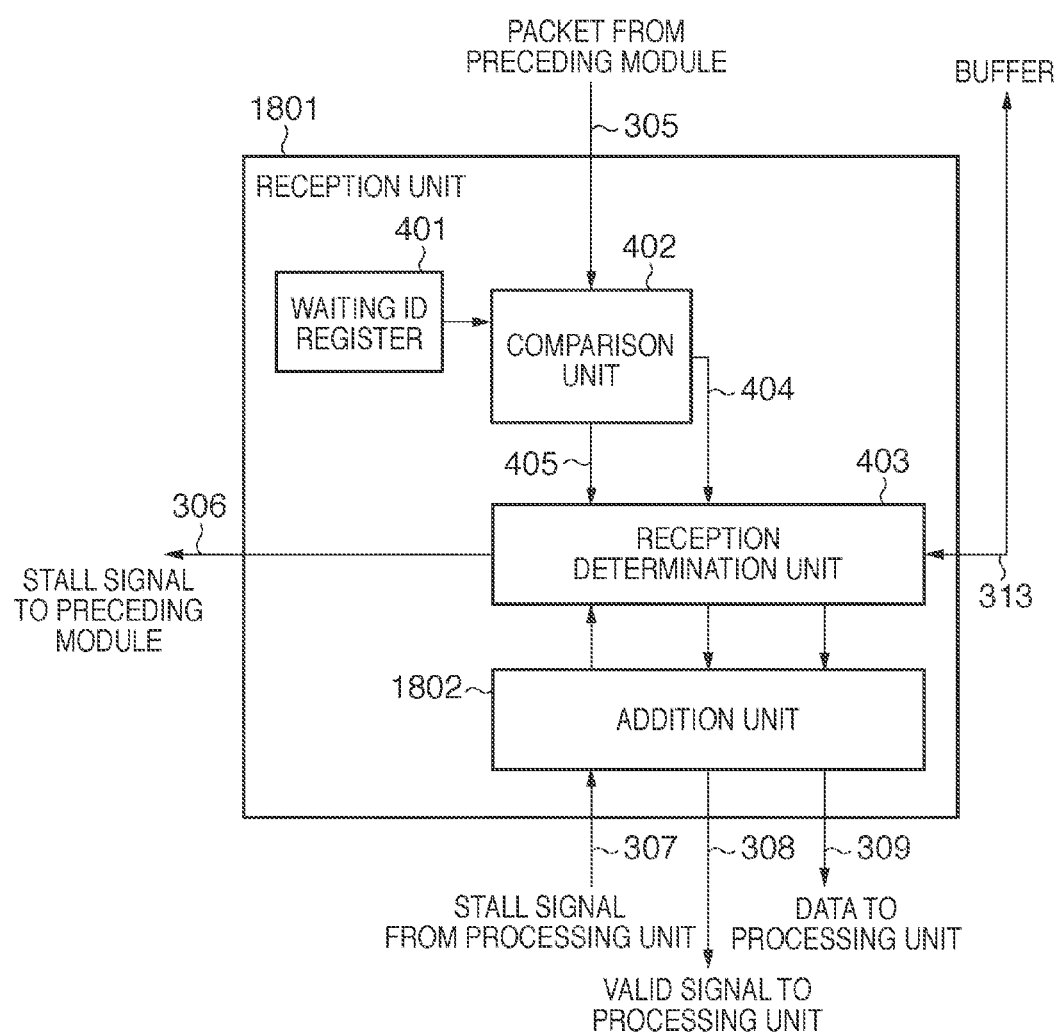
FIG. 14 is a block diagram showing the arrangement of the reception unit of an addition communication unit in yet another embodiment.

In the image processing apparatus of the embodiment described with reference to FIG. 12, at least some processing modules 104 include addition communication units (not shown) instead of the communication units 106. The addition communication unit adds a necessary auxiliary region to image data, and transfers the image data to the processing unit. The addition communication unit includes a reception unit 1801 shown in FIG. 14 instead of the reception unit 302, unlike the communication unit 106. The reception unit 1801 further includes an addition unit 1802, unlike the reception unit 302. The addition unit 1802 has the same arrangement as that of the addition unit 1605.

According to the arrangement of this embodiment, as shown in FIG. 11A, pipeline processing for image data in this case is achieved by processes by the modules A, B, C, and E that form the first processing flow, and processes by the modules D and F that form the second processing flow. Even when the modules C and D require auxiliary regions of different sizes, the addition communication units are arranged in the modules C and D so that image data having auxiliary regions of necessary sizes can be transferred to processing units 108 of both the modules C and D. As a consequence, image data of appropriate sizes can be efficiently transferred, implementing desired image processing.

When an invalidation communication unit 901 need not perform invalidation, "0" is designated as the values of an upper end addition count designation register 1606 and left end addition count designation register 1607. Further, it suffices to set, in a valid image height register 609 and valid image width register 610, the height and width of an image output from a preceding module to the processing unit. As for a pixel value to be added, an end pixel may be stored and added by the designated number of pixels. Alternatively, pixel values in a region designated near the end may be stored and output in a mirror image form.

When the processing flow is branched into a plurality of flows, an addition module or a processing module having an addition communication unit can be arranged to input image data having an appropriate number of pixels to each processing module. In the following embodiment, a branch flow requiring an auxiliary region having a minimum number of pixels is specified among branch flows. Then, an auxiliary region corresponding to this branch flow is added, and an input management module 103 receives image data. Each addition module adds an auxiliary region to complement a shortage. By installing the addition module on the preceding stage of each processing module or replacing the communication unit 106 with the addition communication unit, the input management module 103 need not add an auxiliary region.

Figure 11F:
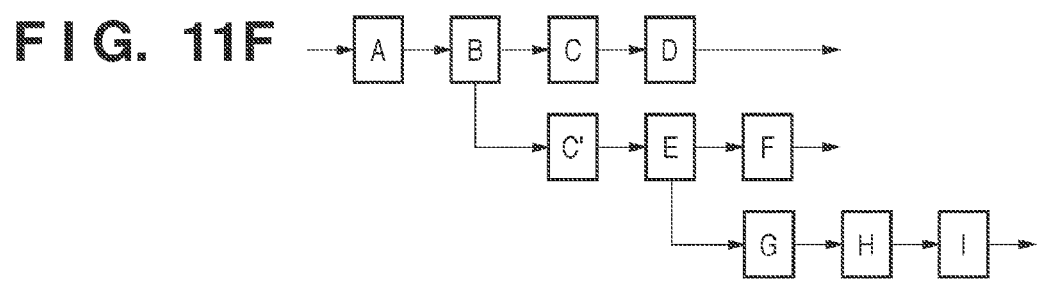

For example, a case in which the processing flow is branched at two or more portions, as shown in FIG. 11F, the processing module D requires an auxiliary region of two pixels at each of the top and bottom, the processing module E requires an auxiliary region of three pixels at each of the top and bottom, and the processing module H requires an auxiliary region of one pixel at each of the top and bottom will be explained. As shown in FIG. 11F, invalidation modules C and C' are arranged on the preceding stages of the processing modules D and E, respectively. Further, an addition module G is arranged on the preceding stage of the processing module H. An input management module A adds an auxiliary region to an input image so that the processing module B outputs image data to which an auxiliary region of three pixels at each of the top and bottom is added. In this case, the invalidation module C deletes one pixel at each of the top and bottom from the auxiliary region, and the addition module G adds one pixel at each of the top and bottom to the auxiliary region. All the processing modules D, E, and G can receive image data having auxiliary regions each of a necessary number of pixels. In this manner, a combination of the invalidation module and addition module can more flexibly form the processing flow.

The above embodiments have explained an example in which modules are pipeline-connected. In each embodiment, modules may be connected by a ring bus instead of the pipeline connection. In this case, the same processing as those in the above embodiments can be also performed.

For example, a case in which the processing flow is branched at two or more portions, as shown in FIG. 11A, will be examined. Assume that the processing module D performs scaling processing at large magnification such as thumbnail image generation processing, and the processing module F performs processing of analyzing a frequency distribution pertaining to pixels such as the histogram of an input image. In this case, the processing module D refers to neighboring pixels specified to scaling processing, and may perform an operation of, for example, deleting the auxiliary region of an input image because it does not refer to a peripheral image of two or more columns and two or more lines in, for example, linear interpolation processing. In this fashion, depending on the algorithm of a processing module, the processing module sometimes executes an operation of deleting an input image region which does not affect an output image. In this case, a histogram generated by the processing module F for a region which does not appear in an output image is not proper as a histogram for the output image. In this embodiment, a pixel region not referred by the module D may be deleted by deleting or adding an auxiliary region in the module E or additionally in the module F. As a result, an accurate analysis result can be obtained for an image region output from the module D. Not only a region difference necessary as an input is deleted or added, but also a region difference may be deleted or added in accordance with the characteristic of the processing algorithm.

Aspects of the present invention can also be realized by a computer of a system or apparatus (or devices such as a CPU or MPU) that reads out and executes a program recorded on a memory device to perform the functions of the above-described embodiment(s), and by a method, the steps of which are performed by a computer of a system or apparatus by, for example, reading out and executing a program recorded on a memory device to perform the functions of the above-described embodiment(s). For this purpose, the program is provided to the computer for example via a network or from a recording medium of various types serving as the memory device (for example, computer-readable medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application Nos. 2010-145528, filed Jun. 25, 2010, and 2011-112897, filed May 19, 2011, which are hereby incorporated by reference herein in their entirety.

What is claimed is:

1. An image processing apparatus for processing image data by a plurality of pipeline-connected processing modules, comprising:
a first plurality of pipeline-connected processing modules including a processing module which processes image data for every first size; and
a second plurality of pipeline-connected processing modules including a processing module which processes image data for every second size different from the first size, wherein the second plurality of pipeline-connected processing modules are branched from the first plurality of pipeline-connected processing modules,
wherein the second plurality of pipeline-connected processing modules include, at a start, a change unit constructed to acquire partial image data of the first size from the first plurality of pipeline-connected processing modules and to change the partial image data of the first size into partial image data of the second size.

2. The apparatus according to claim 1, wherein the change unit is further constructed to:
when the first size is larger than the second size, delete data of a predetermined size from a periphery of the partial image data of the first size to coincide with the second size, and
transmit partial image data coincident with the second size to a subsequent processing module.

3. The apparatus according to claim 1, wherein the second plurality of pipeline-connected processing modules are merged with the first plurality of pipeline-connected processing modules, and further include a re-change unit arranged at an end of the second plurality of pipeline-connected processing modules and constructed to change again partial image data of the second size into partial image data of the first size.

4. An image processing apparatus for processing image data by a plurality of pipeline-connected processing modules, comprising:
a first plurality of pipeline-connected processing modules including a processing module which processes image data for every first size;
a second plurality of pipeline-connected processing modules including a processing module which processes image data for every second size different from the first size, wherein the second plurality of pipeline-connected processing module are merged with the first plurality of pipeline-connected processing modules; and
a change unit arranged at an end of the second plurality of pipeline-connected processing modules and constructed to change partial image data of the second size into partial image data of the first size.

5. The apparatus according to claim 4, wherein the change unit is further constructed to:
when the second size is larger than the first size, delete data of a predetermined size from a periphery of a partial image of the second size to coincide with the first size, and
transmit partial image data coincident with the first size to a subsequent processing module.

6. The apparatus according to claim 4, wherein the change unit outputs image data in which the number of pixels of an auxiliary region positioned around a valid region corresponding to image data input to the image processing apparatus is changed without changing image data contained in the valid region out of image data input from a preceding module.

7. The apparatus according to claim 6, wherein the change unit deletes part or all of the auxiliary region.

8. The apparatus according to claim 6, wherein the change unit adds another auxiliary region to image data input from the preceding module.

9. The apparatus according to claim 1, wherein the change unit is further constructed to:
when the first size is smaller than the second size, add data of a predetermined size to the periphery of the partial image data of the first size to coincide with the second size, and
transmit partial image data coincident with the second size to a subsequent processing module.

10. The apparatus according to claim 9, wherein with respect to a packet used in communication between the plurality of pipeline-connected processing modules, the packet holds validity information indicating whether data held in the packet is valid, and
the change unit is further constructed to add the data of the predetermined size by changing the validity information held in the packet.

11. The apparatus according to claim 2, wherein with respect to a packet used in communication between the plurality of pipeline-connected processing modules, the packet holds validity information indicating whether data held in the packet is valid, and
the change unit is further constructed to delete the data of the predetermined size by changing the validity information held in the packet.

12. The apparatus according to claim 4, wherein the change unit is further constructed to:
when the second size is smaller than the first size, add addition data of a predetermined size to the periphery of the partial image of the second size to coincide with the first size, and
transmit partial image data coincident with the first size to a subsequent processing module.

13. The apparatus according to claim 12, wherein with respect to a packet used in communication between the plurality of pipeline-connected processing modules, the packet holds validity information indicating whether data held in the packet is valid, and
the change unit is further constructed to add the data of the predetermined size by changing the validity information held in the packet.

14. The apparatus according to claim 5, wherein with respect to a packet used in communication between the plurality of pipeline-connected processing modules, the packet holds validity information indicating whether data held in the packet is valid, and
the change unit is further constructed to delete the data of the predetermined size by changing the validity information held in the packet.

15. A method of processing image data by a plurality of pipeline-connected processing modules,
    the plurality of pipeline-connected processing modules comprising:
    a first plurality of pipeline-connected processing modules including a processing module which processes image data for every first size; and
    a second plurality of pipeline-connected processing modules including a processing module which processes image data for every second size different from the first size, wherein the second plurality of pipeline-connected processing modules are branched from the first plurality of pipeline-connected processing modules,
    the method comprising:
    at a start of the second plurality of pipeline-connected processing modules, acquiring partial image data of the first size from the first plurality of pipeline-connected processing modules; and
    changing the partial image data of the first size into partial image data of the second size.

16. A method of processing image data by a plurality of pipeline-connected processing modules,
    the plurality of pipeline-connected processing modules comprising:
    a first plurality of pipeline-connected processing modules including a processing module which processes image data for every first size; and
    a second plurality of pipeline-connected processing modules including a processing module which processes image data for every second size different from the first size, wherein the second plurality of pipeline-connected processing module are merged with the first plurality of pipeline-connected processing modules;
    the method comprising:
    at an end of the second plurality of pipeline-connected processing modules, changing partial image data of the second size into partial image data of the first size.

* * * * *